United States Patent
Lin et al.

(10) Patent No.: US 10,203,775 B2
(45) Date of Patent: Feb. 12, 2019

(54) SWITCHING ASSEMBLY

(71) Applicant: Wistron Corporation, New Taipei (TW)

(72) Inventors: Tong-Bo Lin, New Taipei (TW); Xiao-Lei Du, New Taipei (TW)

(73) Assignee: Wistron Corporation, New Taipei (TW)

( * ) Notice: Subject to any disclaimer, the term of this patent is extended or adjusted under 35 U.S.C. 154(b) by 31 days.

(21) Appl. No.: 15/688,874

(22) Filed: Aug. 29, 2017

(65) Prior Publication Data

US 2018/0239446 A1    Aug. 23, 2018

(30) Foreign Application Priority Data

Feb. 22, 2017  (CN) .......................... 2017 1 0096167

(51) Int. Cl.
  *G06F 3/033*    (2013.01)
  *G06F 3/0354*   (2013.01)
  *G06F 3/038*    (2013.01)
  *G06F 3/0485*   (2013.01)

(52) U.S. Cl.
  CPC ........ *G06F 3/03541* (2013.01); *G06F 3/0383* (2013.01); *G06F 3/0485* (2013.01); *G06F 2203/0333* (2013.01)

(58) Field of Classification Search
  CPC .. G06F 3/03541; G06F 3/0383; G06F 3/0485; G06F 2203/0333

USPC ......................................................... 345/163
See application file for complete search history.

(56) References Cited

U.S. PATENT DOCUMENTS

| | | | | |
|---|---|---|---|---|
| 2006/0022944 | A1* | 2/2006 | Pai ....................... | G06F 3/03543 345/163 |
| 2006/0044272 | A1* | 3/2006 | Koo ...................... | G06F 3/0362 345/163 |
| 2017/0277283 | A1* | 9/2017 | Chao .................... | G06F 3/03543 |

FOREIGN PATENT DOCUMENTS

TW        M350057        2/2009

\* cited by examiner

*Primary Examiner* — Adam J Snyder
(74) *Attorney, Agent, or Firm* — JCIPRNET

(57) ABSTRACT

A switching assembly for changing relative states of a first object and a second object is provided. The switching assembly includes a fixing member fixed on the first object, a first guiding rod, a second guiding rod, and a moving member movably disposed on the first object. The fixing member has a guiding rib with an extension direction parallel to a first axis, and the first guiding rod is slidably coupled to the guiding rib to move along the first axis. The second object is movably coupled to and driven by the moving member. The second guiding rod is pivoted between the first guiding rod and the moving member in the first axis. The first guiding rod is suited for being forced to move the second guiding rod and the moving member, so as to rotate the second guiding rod relative to the first guiding rod and the moving member.

15 Claims, 21 Drawing Sheets

SWITCHING ASSEMBLY

CROSS-REFERENCE TO RELATED APPLICATION

This application claims the priority benefit of China application serial no. 201710096167.6, filed on Feb. 22, 2017. The entirety of the above-mentioned patent application is hereby incorporated by reference herein and made a part of this specification.

BACKGROUND

Technical Field

The disclosure relates to a switching assembly.

Description of Related Art

Currently a mouse in the field of computers may be held by a user by palm so as to control the motion of a mouse cursor. As such method accords with operating habits of most users and operating systems, the mouse has become the most common input device.

As computers and the related peripheral devices evolve, the mouse with only a left button and a right button also develops into the kind of scroll wheel mouse equipped with a scroll wheel. The scroll wheel of the mouse may be turned by the user with a finger so that the screen window is scrolled up and down in the vertical direction to facilitate the user to browse web pages or documents. After the release of the scroll wheel mouse, manufacturers have undertaken even more research and development on a variety of functions of the scroll wheel mouse, and the development of the mouse has become more and more mature.

However, with the development of easy-to-carry laptop computers, most users long for a more convenient way to accommodate and carry their laptops as well as the related peripheral devices. As for the mouse, since the scroll wheel is exposed outside the casing, it is easy for it to become damaged and inoperative due to an external impact such as dropping or being bumped by a foreign object during the process of carrying and moving. Therefore, for a person skilled in the art, an issue to contemplate and solve is how to provide enough protection to the scroll wheel when the mouse is carried around.

SUMMARY

The disclosure provides a switching assembly used for changing relative states of a first object and a second object in an electronic device so as to achieve an effect of accommodating and protecting the objects.

The switching assembly of the disclosure is used for changing relative states of the first object and the second object. The switching assembly includes a fixing member, a first guiding rod, a moving member and a second guiding rod. The fixing member is fixed on the first object and has a guiding rib, and an extension direction of the guiding rib is parallel to a first axis. The first guiding rod is slidably coupled to the guiding rib to move along the first axis relative to the fixing member. The moving member is movably disposed on the first object. The second object is movably coupled to and is driven by the moving member. The second guiding rod is pivoted between the first guiding rod and the moving member in the first axis. The first guiding rod is suited for being forced to move the second guiding rod and the moving member along the first axis so as to rotate the second guiding rod relative to the first guiding rod and the moving member, thereby switching the second guiding rod between a first state and a second state. In the first state, the second guiding rod is slidably connected to the guiding rib. In the second state, the second guiding rod contacts an end of the first guiding portion along the first axis.

Based on the above, by the mutual alignment between the first guiding rod, the second guiding rod and the moving member in the switching assembly, wherein the second guiding rod is pivoted between first guiding rod and the moving member, when the first guiding rod is forced to be driven, the second guiding rod and the moving member are further driven so as to move coaxially, thereby changing the position of the second object relative to the first object while the moving member is moved. At the same time, depending on whether the second guiding rod is interfered or not, the second guiding rod is either in a movable state or in a positioning state, wherein the moving member is moved to change physical location itself and positioned to be the positioning state, so that the first object and the second object of the electronic device at this moment may be operated in another state. As a result, the switching assembly may create different states so as to preferably improve the range of application of the electronic device.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention provides a switching assembly suited for an electronic device. The switching assembly is used for changing relative states of a first object and a second object in the electronic device so as to achieve an effect of accommodating the objects by switching operation of the switching assembly. In the following, different embodiments are respectively provided for the purpose of illustration.

Figure 1:
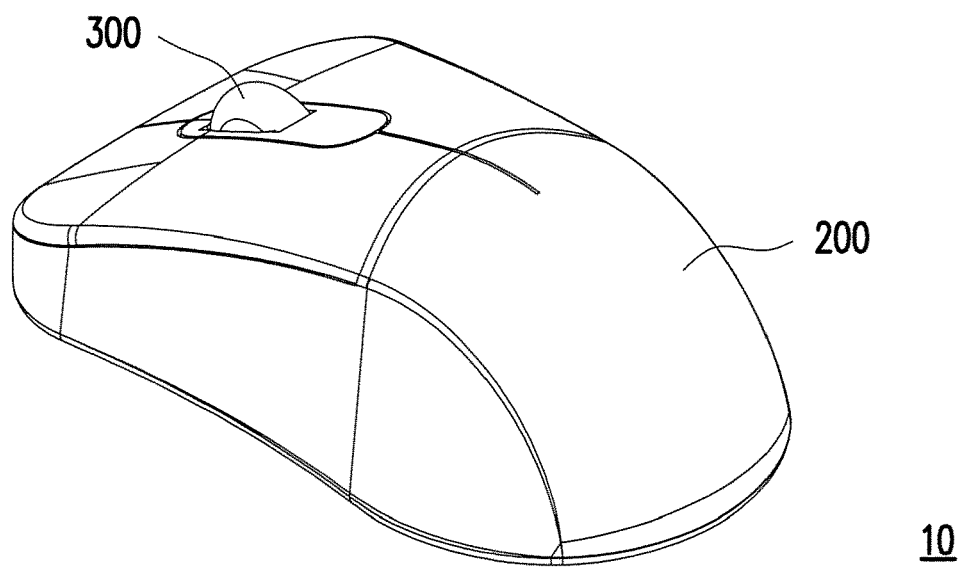
FIG. 1 is a schematic view of an electronic device according to an embodiment of the invention.
Figure 2:
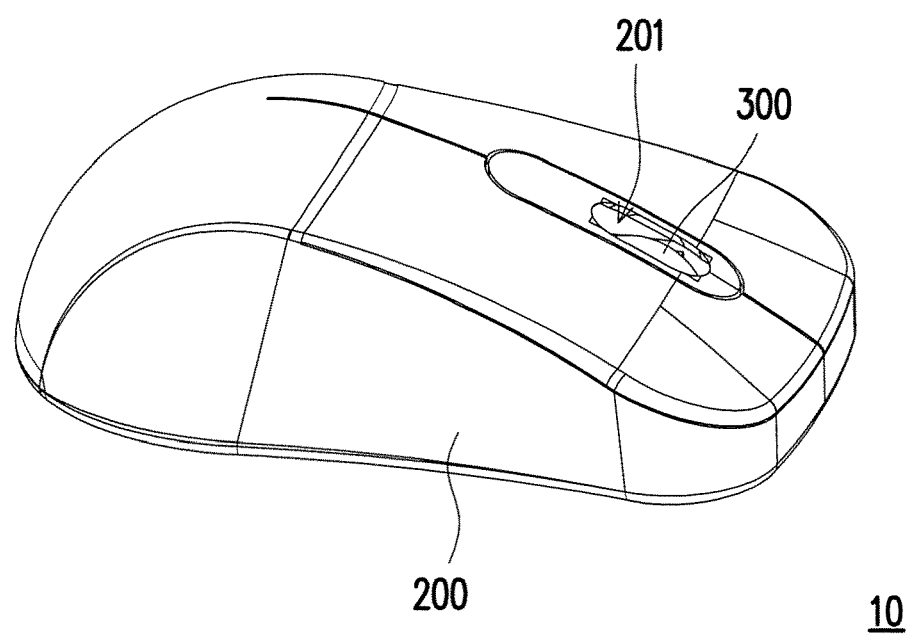
FIG. 2 is a schematic view of the electronic device of FIG. 1 in another state.
Figure 3:
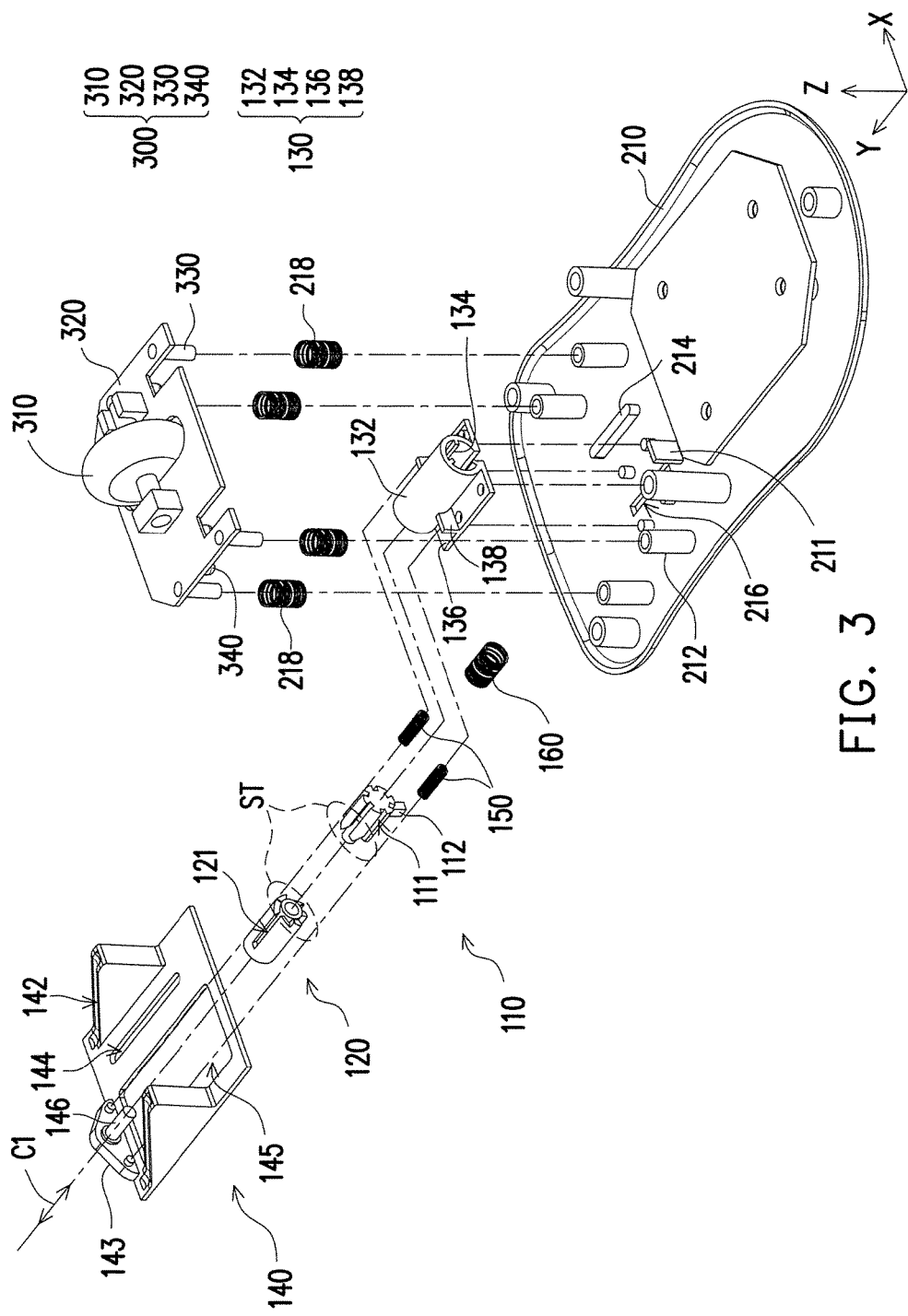
FIG. 3 is an exploded view of some of the components of the electronic device of FIG. 1.
Figure 4:
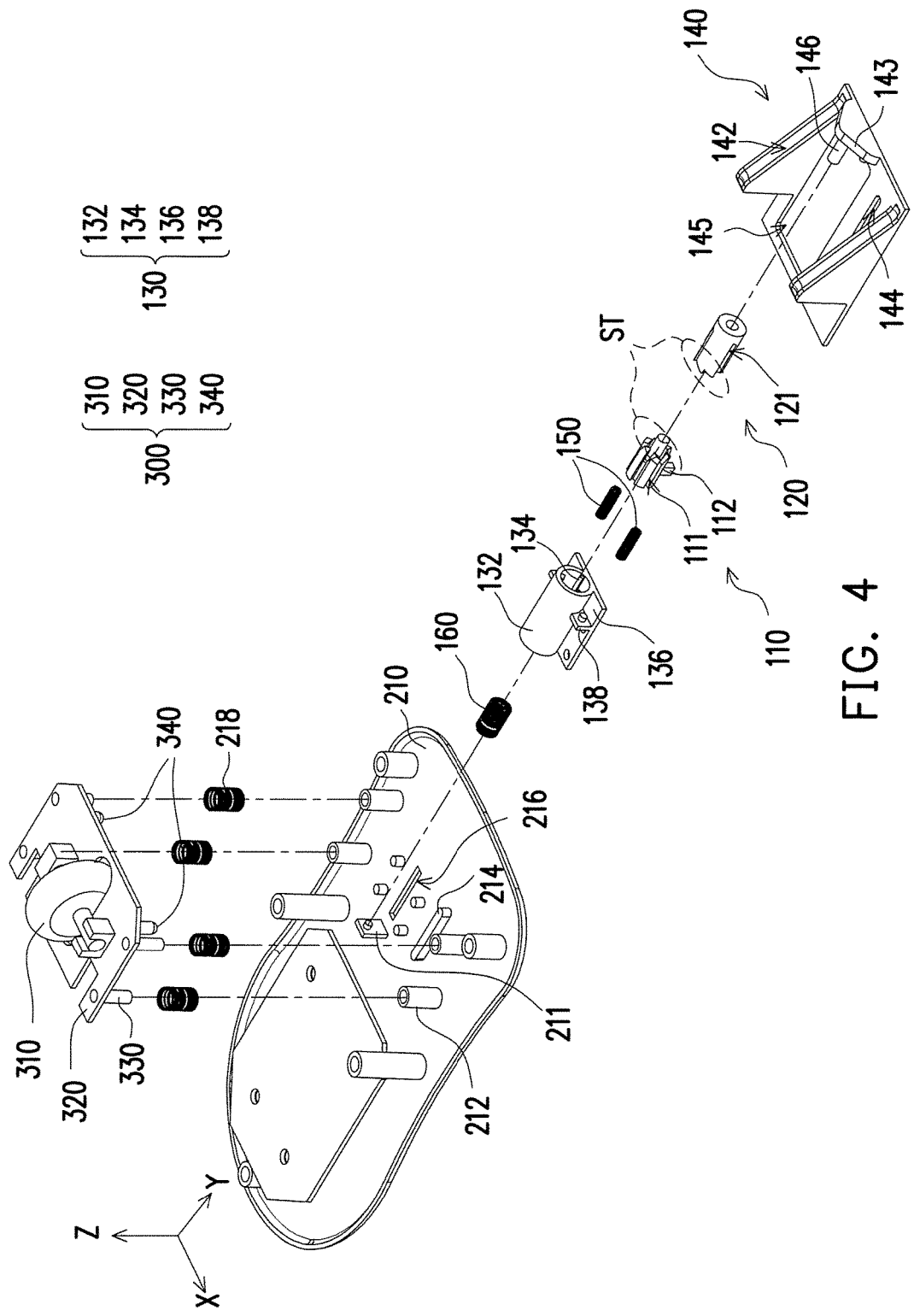
FIG. 4 illustrates some of the components of the electronic device of FIG. 3 from another angle.

FIG. 1 is a schematic view of an electronic device according to an embodiment of the invention, and here the electronic device is a mouse. FIG. 2 is a schematic view of the electronic device of FIG. 1 in another state. In light of FIG. 1 and FIG. 2, in this embodiment, the mouse has a scroll wheel module 300 that is ascendable and descendible. FIG. 3 is an exploded view of some of the components of the electronic device of FIG. 1. FIG. 4 illustrates some of the components of the electronic device of FIG. 3 from another angle. Here a rectangular X-Y-Z coordinate system is simultaneously provided to facilitate description of relevant components, and FIG. 3 and FIG. 4 respectively present different assembly relationships to prevent misjudgment due to too many assembly lines in the same drawing.

With reference to FIG. 1 to FIG. 4 simultaneously, in this embodiment, an electronic device 10 includes a switching assembly 100, a casing 200 and a scroll wheel module 300. Here the switching assembly 100 and the scroll wheel module 300 are disposed inside the casing 200. The scroll wheel module 300 includes a circuit board 320, a scroll wheel 310 and brackets 330. Here the scroll wheel 310 is rotatably disposed on the circuit board 320, and is assembled to a plurality of brackets 212 on a base 210 of the casing 200 by a plurality of brackets 330 disposed under the circuit board 320 correspondingly. At the same time, the scroll wheel module 300 is driven by the switching assembly 100 and an elastic member 218 so that the scroll wheel 310 may protrude out of the casing 200 of the mouse via an opening 201 (as shown in FIG. 1) or sink inside the casing 200 via the opening 201. Accordingly, an effect of accommodating the scroll wheel 310 is achievable when the mouse is not in use, and the scroll wheel module 300 is thus prevented from being damaged by an external impact that the electronic device 10 takes when being moved or transported. It should be stated that this embodiment only recites the technique as to how the scroll wheel module 300 is driven by the switching assembly 100. As for other technical features of the scroll wheel module 300, since they can already be known from the prior art, details thereof are omitted here.

Accordingly, in the electronic device 10, a state of a first object (such as the scroll wheel module 300, particularly the scroll wheel 310) relative to a second object (the casing 200 of the mouse) may be changed by the switching assembly 100 so as to achieve the effect of accommodating the first object.

Figure 5:
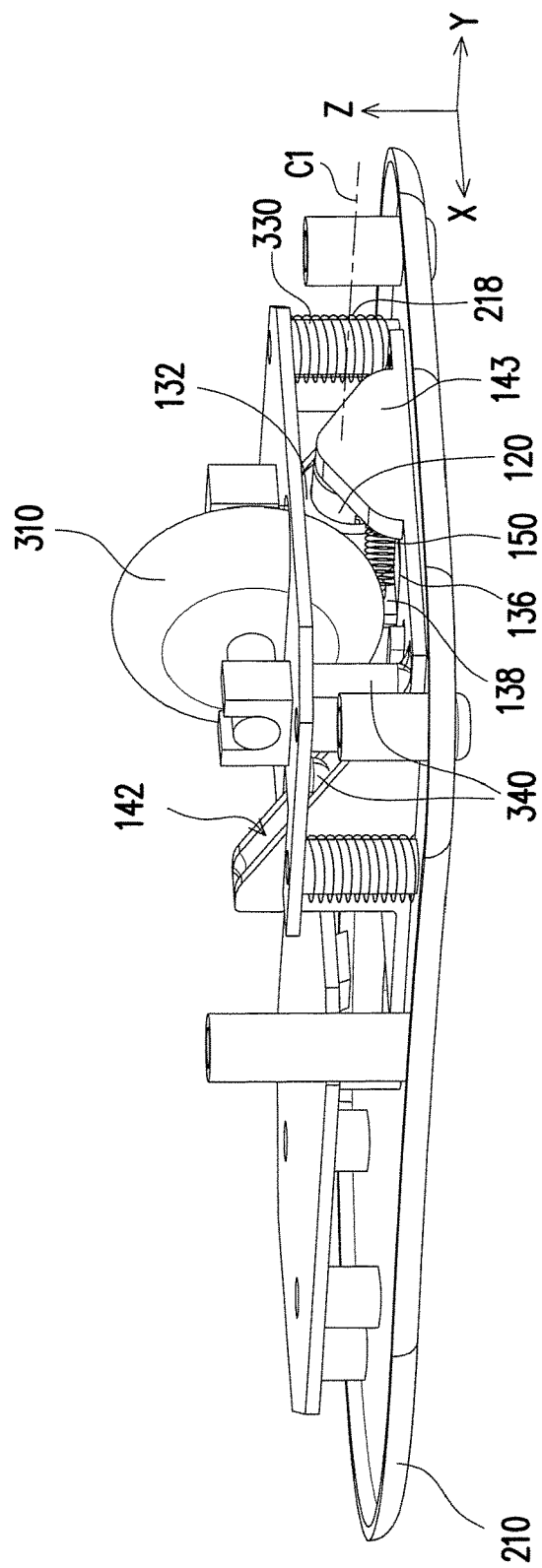
FIG. 5 and FIG. 6 illustrate schematic views of some of the components of the mouse in different states respectively.
Figure 6:
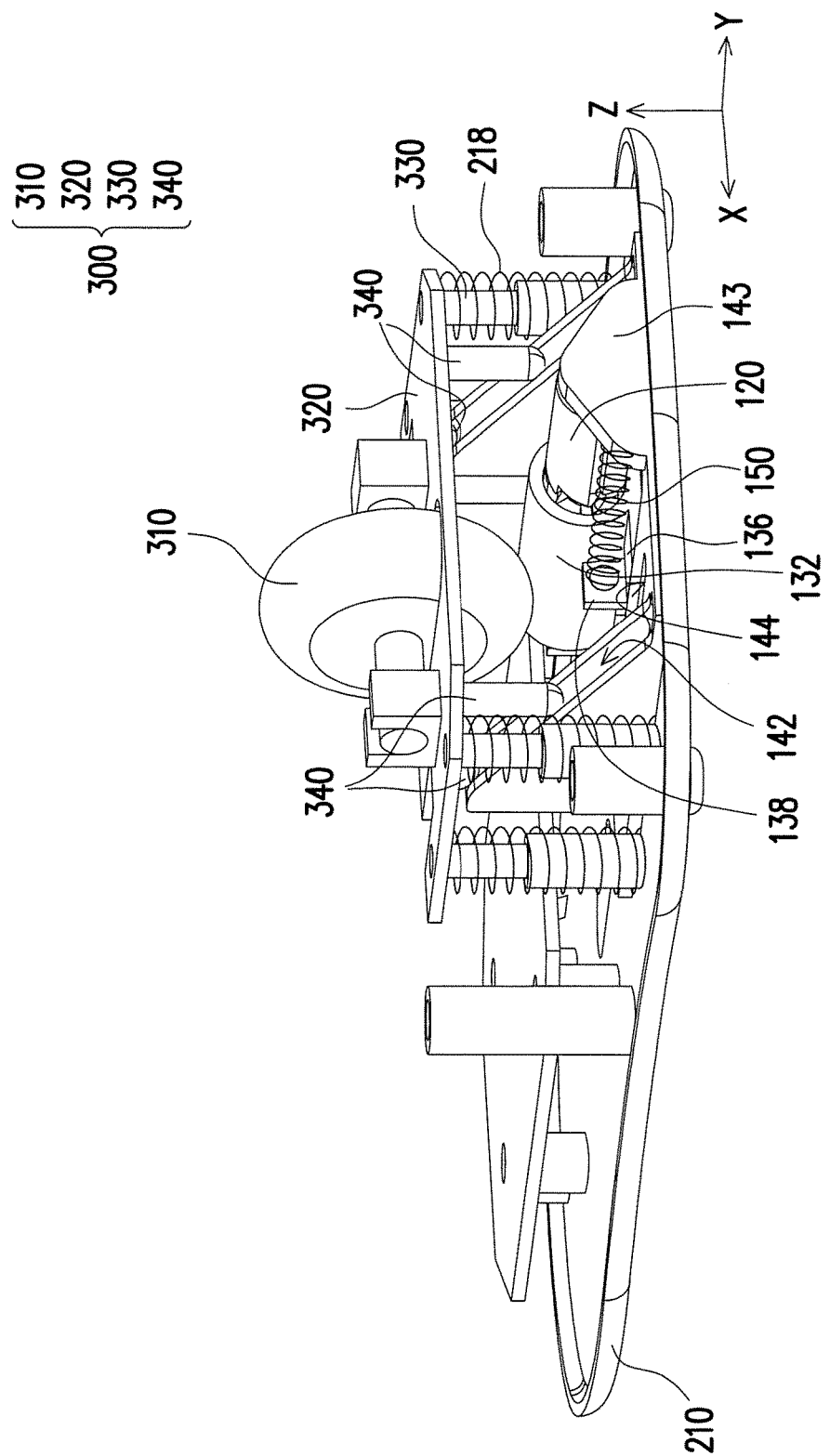

FIG. 5 and FIG. 6 illustrate schematic views of some of the components of the mouse in different states respectively. With reference to FIG. 3 to FIG. 6 simultaneously, in this embodiment, the switching assembly 100 includes a fixing member 130, a first guiding rod 110, a second guiding rod 120 and a moving member 140. The fixing member 130 is fixed on the first object (i.e. the base 210 of the casing 200 of this embodiment) by a wing portion 136 thereof. The fixing member 130 has a sleeve 132. The first guiding rod 110 and the second guiding rod 120 together are movably disposed inside the sleeve 132 along an axis C1. The moving member 140 is movably disposed on the base 210 along the Y axis. The second guiding rod 120 is pivoted between the first guiding rod 110 and the moving member 140 in the axis C1. Here the axis C1 is substantially parallel to the Y axis.

Based on the abovementioned component configuration relationship, when the first guiding rod 110 is forced to move the second guiding rod 120 along the axis C1, the moving member 140 is then simultaneously driven to move along the axis C1 so that a relative rectilinear motion is generated along the axis C1 between the fixing member 130 and the moving member 140. Moreover, in this embodiment, the moving member 140 has an oblique guiding slot 142, and the scroll wheel module 300 further includes a guiding rod 340 that is disposed under the circuit board 320 and movably coupled to the oblique guiding slot 142.

Specifically, with reference to FIG. 3 and FIG. 4 again, in terms of structural configuration, the moving member 140 has an opening 145 for the fixing member 130 being located inside the opening 145. The moving member 140 and the base 210 generate a rectilinear motion along the axis C1 by a mutual alignment of a guiding slot 144 and a protruding rib 214. Besides, the switching assembly 100 further includes an elastic member 150 and an elastic member 160. Here the elastic member 160 is connected between the first guiding rod 110 and a barricade 211 of the base 210, and the elastic member 150 is connected between a barricade 138 on the wing portion 136 of the fixing member 130 and a barricade 143 of the moving member 140.

On the other hand, the second guiding rod 120 is substantially sleeved onto a shaft 146 on the barricade 143 to achieve a pivoting effect so that the second guiding rod 120 and the moving member 140 may move along the axis C1 in conjunction with each other. The first guiding rod 110 and the second guiding rod 120 contact each other by a spiral-toothed structure ST. The spiral-toothed structure ST is arranged with a plurality of spiral teeth circling around the axis C1, and each spiral tooth has a spiral-toothed bevel inclined relative to the axis C1 (that is, the axis C1 is neither parallel nor orthogonal to the spiral-toothed bevel). Accordingly, when the first guiding rod 110 and the second guiding rod 120 are applied with a normal force along the axis C1 without being restricted by other structures (i.e. one of the first guiding rod 110 and the second guiding rod 120 is forced so as to drive the other), what then results is a relative rotation of these two components that is centered on the axis C1 so as to achieve the abovementioned effect of the second guiding rod 120 being pivoted to the first guiding rod 110 in axis C1.

In this embodiment, the elastic member 160 constantly drives the first guiding rod 110 to move toward the direction of the negative Y axis and the elastic member 150 likewise constantly drives the moving member 140 to move toward the direction of the negative Y axis, thereby achieving the effects of resetting the first guiding rod 110 and the moving member 140 respectively. Because the second guiding rod 120 is substantially connected to the moving member 140 along the axis C1, the elastic member 150, while driving the moving member 140 to be reset, also provides an applied force to the second guiding rod 120 in the direction of the negative Y axis. The following development will be described in detail in an explication of the movement of the switching assembly 100.

Based on the above, when the moving member 140 is moved back and forth along the Y axis, the scroll wheel model 300 then generates movement modes of moving up and down along the Z axis, as a result, thus enabling the scroll wheel 310 to achieve an effect of protruding out of or sinking inside the casing 200 as shown in FIG. 1 and FIG. 2. It should be further stated that, with reference to FIG. 3 and FIG. 4 again, the first guiding rod 110 of this embodiment has a push handle 112 that penetrates through an opening 216 of the base 210 to be revealed from under the casing 200 of the mouse. A user may drive the first guiding rod 100 by applying a force to the push handle 112, thereby further driving the second guiding rod 120, the moving member 140 and the scroll wheel module 300 to achieve the foregoing state of movement.

FIG. 7A to FIG. 7I illustrate different states of the switching assembly respectively. Here the fixing member 130 is shown by dotted lines and the first guiding rod 110 and the second guiding rod 120 are shown by solid lines so as to facilitate identification of the structures and relative positions of the components.

Figure 7A:
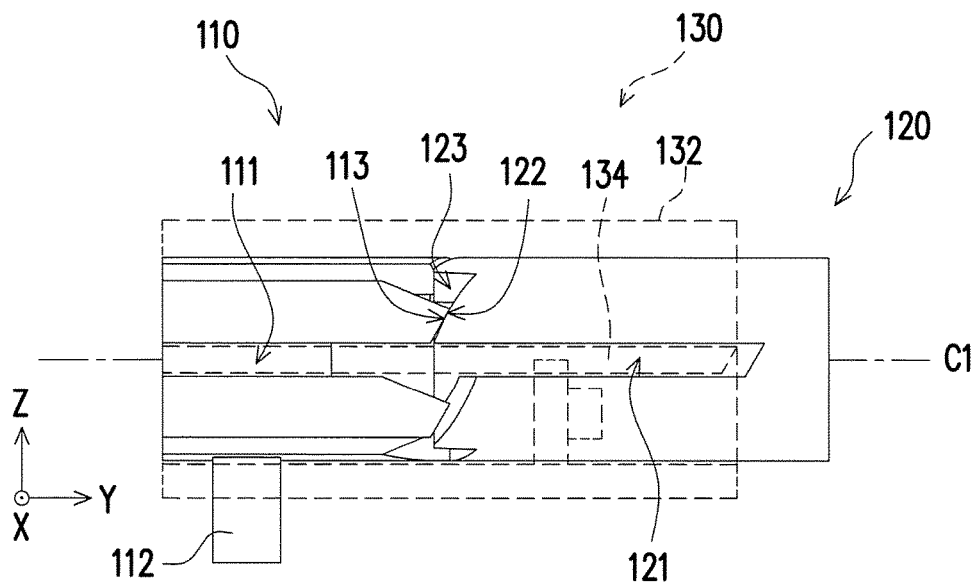
FIG. 7A to FIG. 7J illustrate different states of the switching assembly respectively.

Firstly, please refer to FIG. 7A with FIG. 3 to FIG. 5. The state as shown in FIG. 7A indicates that the scroll wheel module 300 is in the sinking position as shown in FIG. 5. At this moment, the entirety of the first guiding rod 110 and a portion of the second guiding rod 120 are accommodated inside the sleeve 132 of the fixing member 130, the brackets 330 of the scroll wheel module 300 extend inside the brackets 212 of the base 210, and neither of the elastic members 150, 160 and 218 is deformed. It should be noted that the fixing member 130 further has a first guiding portion 134 located inside the sleeve 132, such as a guiding rib, and an extension direction of the first guiding portion 134 is parallel to a first axis. Here the first axis may be viewed as a virtual axis parallel to the axis C1 or the Y axis. The first guiding rod 110 has a third guiding portion 111 provided on the exterior thereof, such as a guiding slot, and the second guiding rod 120 also has a second guiding portion 121 provided on the exterior thereof, such as another guiding slot. Extension directions of the third guiding portion 111 and the second guiding portion 121 are likewise parallel to the first axis. As a result, the third guiding portion 111 and the second guiding portion 121 may be slidably connected to the first guiding portion 134 respectively.

Figure 7B:
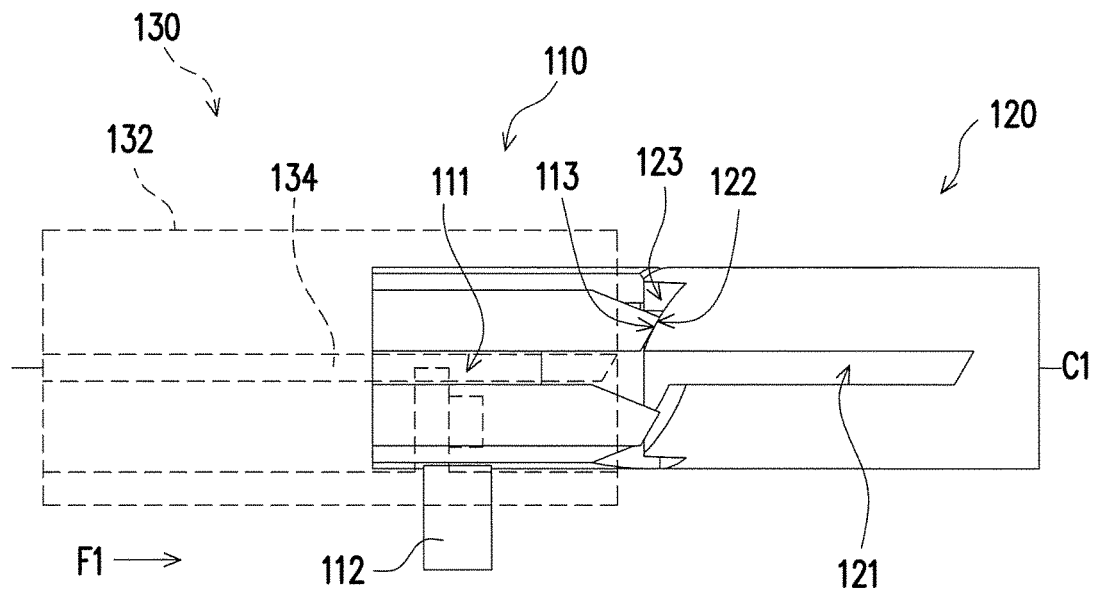

Then, with reference to FIG. 7A and FIG. 7B simultaneously, the user provides an applied force F1 to the push handle 112 to move the first guiding rod 110 toward the direction of the positive Y axis so as to push the second guiding rod 120 out of the sleeve 132. During the process from FIG. 7A to FIG. 7B, the first guiding rod 110 contacts a spiral-toothed bevel 122 of the second guiding rod 120 by a spiral-toothed bevel 113 thereof. However, during the process, the second guiding rod 120 is still in a combined state with the first guiding portion 134 of the fixing member 130 by the second guiding portion 121 thereof. Therefore, even if the first guiding rod 110 and the second guiding rod 120 contact each other by the spiral-toothed bevels 113 and 122 thereof, because of a rotational interference caused by the first guiding portion 134 to the second guiding rod 120, the second guiding rod 120 may only move along the axis C1. It is not until the second guiding rod 120 is completely pushed away from the sleeve 132 that the interference from the first guiding portion 134 is released. In other words, during the process, a portion of the first guiding rod 110 and a portion of the second guiding rod 120 respectively contact each other. Besides, because of interferences from the first guiding portion 134, the third guiding portion 111 and the second guiding portion 121, each of the portions is a part that is fixed by itself (the contacted portions described above do not slip away). That is to say, there is no relative rotation generated between the first guiding rod 110 and the second guiding rod 120.

Figure 7C:
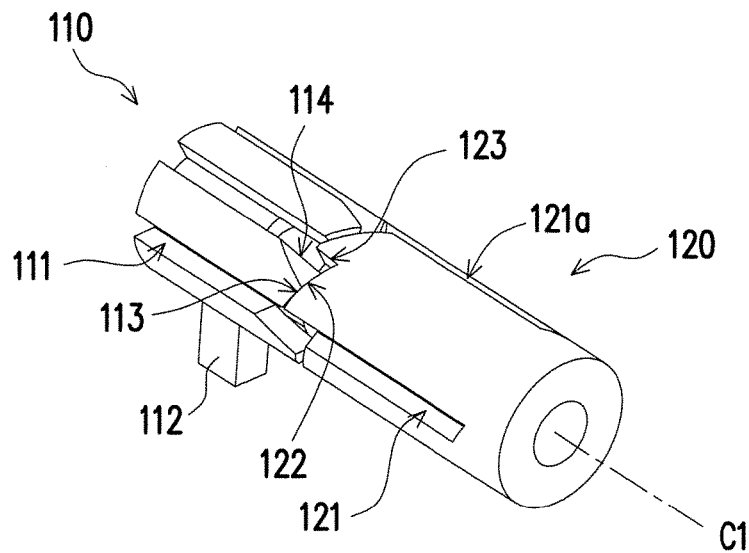
Figure 7D:
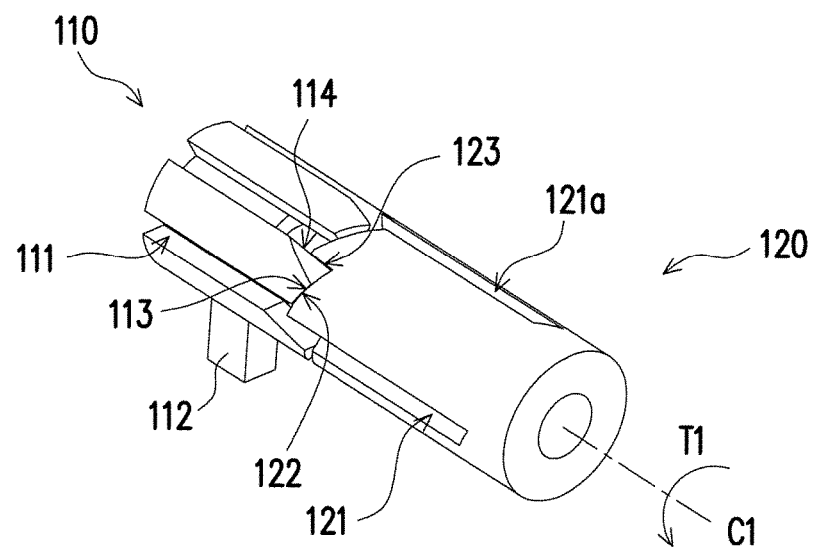

Then, please further refer to FIG. 7B, FIG. 7C and FIG. 7D, wherein FIG. 7C is corresponding to the state as shown in FIG. 7B. After the second guiding rod 120 is moved away from the first guiding portion 134 so that the rotational interference is released, a torque T1 (shown in FIG. 7D) caused by the spiral-toothed bevels 113 and 122 that contact each other as described above then rotates the second guiding rod 120 about the axis C1 relative to the first guiding rod 110. It is not until another spiral-toothed bevel 123 of the second guiding rod 120 contacts another spiral-toothed bevel 114 of the first guiding rod 110 that such rotation is stopped.

Figure 7E:
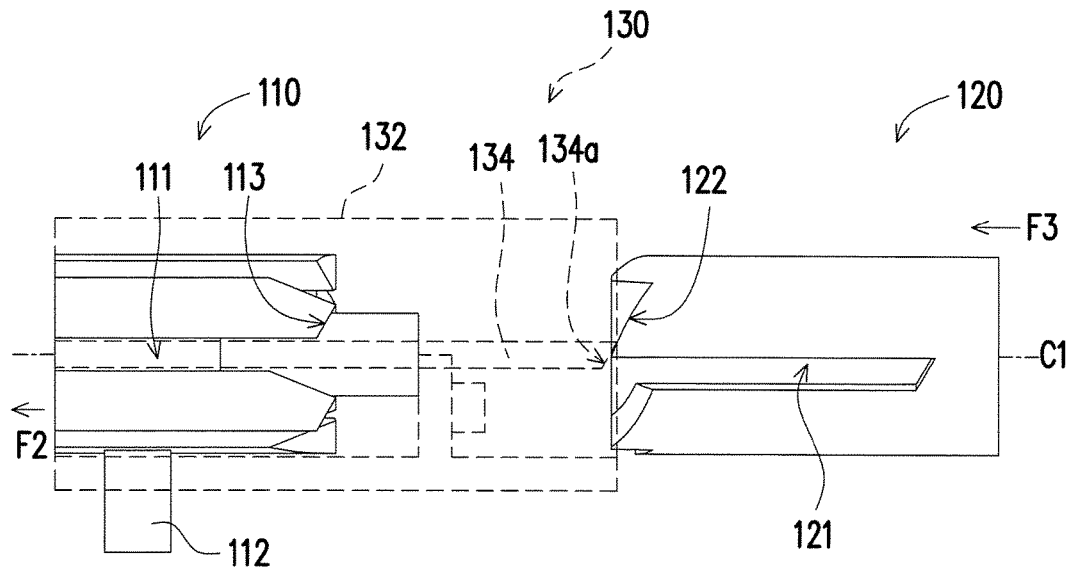

Then, with reference to FIG. 7E, at this moment, the user no longer provides the applied force F1. As a result, the first guiding rod 110 then moves along the axis C1 because of a resilient force F2 of the elastic member 160, that is, moves toward the direction of the negative Y axis so as to be reset (back to the original position as shown in FIG. 7A). At this moment, the second guiding rod 120 is also no longer driven by the first guiding rod 110. Therefore, as the moving member 140 is driven by a resilient force F3 of the elastic member 150, the second guiding rod 120 moves from the state as shown in FIG. 7D to be reset toward the direction of the negative Y axis. However, because at this moment the first guiding portion 134 blocks a moving path of the second guiding rod 120 (i.e. the second guiding rod 120 is rotated by the torque T1 so that the guiding slot, second guiding portion 121, becomes deviated and the second guiding rod 120 is dislocated from the first guiding portion 134), a guiding bevel 134a of the first guiding portion 134 interferes with the spiral-toothed bevel 122 of the second guiding rod 120 along the axis C1 so as to prevent the second guiding rod 120 from moving toward the direction of the negative Y axis. As a result, the second guiding rod 120 is temporarily locked to an opening of the sleeve 132.

Figure 7F:
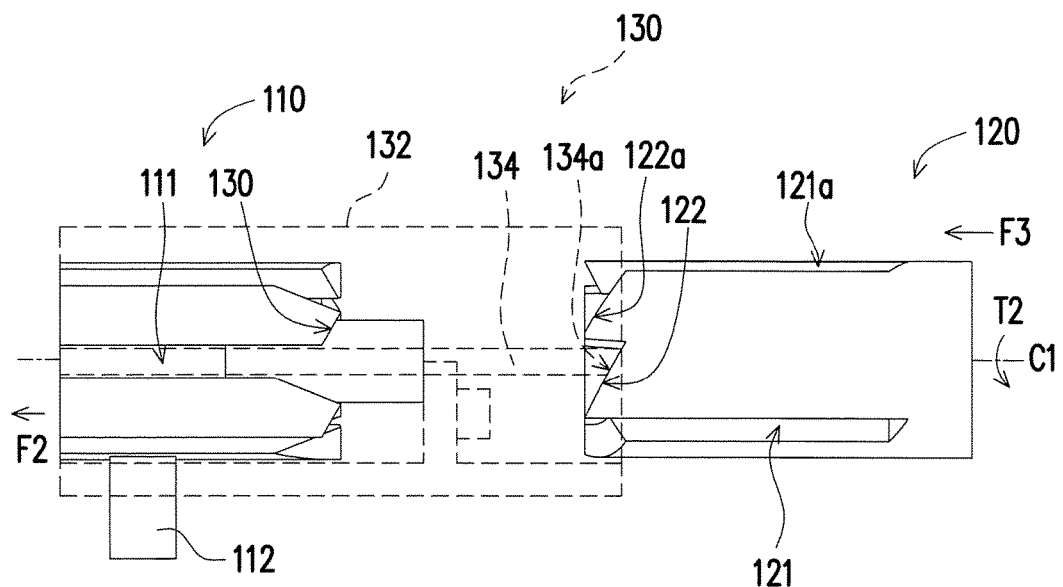

Then, please refer to FIG. 7F. At this moment, it should be noted that the guiding bevel 134a is also in an inclined state relative to the axis C1. That is, the guiding bevel 134a and the spiral-toothed bevel 122 are still in a state in which the bevels thereof contact each other. Therefore, under the influence of the resilient force F3 of the elastic member 150, the second guiding rod 120 is rotated again by the torque T2 so that the guiding bevel 134a of the first guiding portion 134 is locked between two adjacent spiral-toothed bevels 122 and 122a (that is, an end of the first guiding portion 134 is locked between two of the adjacent spiral teeth of the spiral-toothed structure ST). As a result, the second guiding rod 120 may maintain the position as shown in FIG. 7F and no longer move. In other words, at this moment, the moving member 140 maintains the position as shown in FIG. 6 without moving, so that the scroll wheel 310 of the scroll wheel module 300 may be kept in a state of protruding out of the casing 200 to be operated by the user.

Figure 7G:
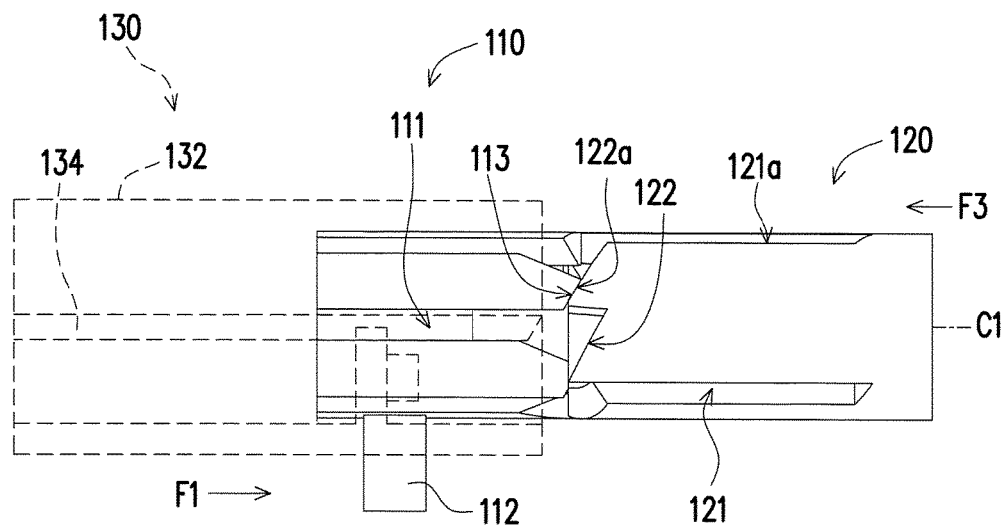
Figure 7H:
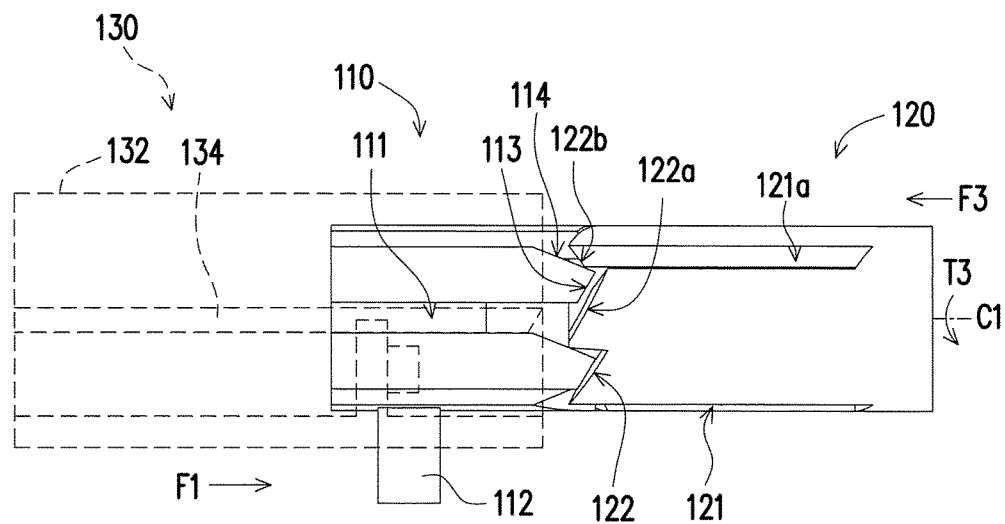

With reference to FIG. 7F to FIG. 7H, when the mouse is no longer in use and the scroll wheel 310 is to be sunk back inside the casing 200, the user provides the applied force F1 to the push handle 112 of the first guiding rod 110 again, so that the first guiding rod 110 is moved from the position as shown in FIG. 7F to the position as shown in FIG. 7G to contact the second guiding rod 120. Here the spiral-toothed bevel 113 contacts the spiral-toothed bevel 122a. At the same time, the user continues to provide the applied force F1 to push the second guiding rod 120 away from the guiding bevel 134a of the first guiding portion 134 (the applied force F1 is greater than the resilient force F3). At this moment, influenced by the contact between the spiral-toothed bevels 113 and 122a, the second guiding rod 120 is rotated again by the torque T3 until the spiral-toothed bevel 113 is locked between the spiral-toothed bevel 122a and a spiral-toothed bevel 122b.

Figure 7I:
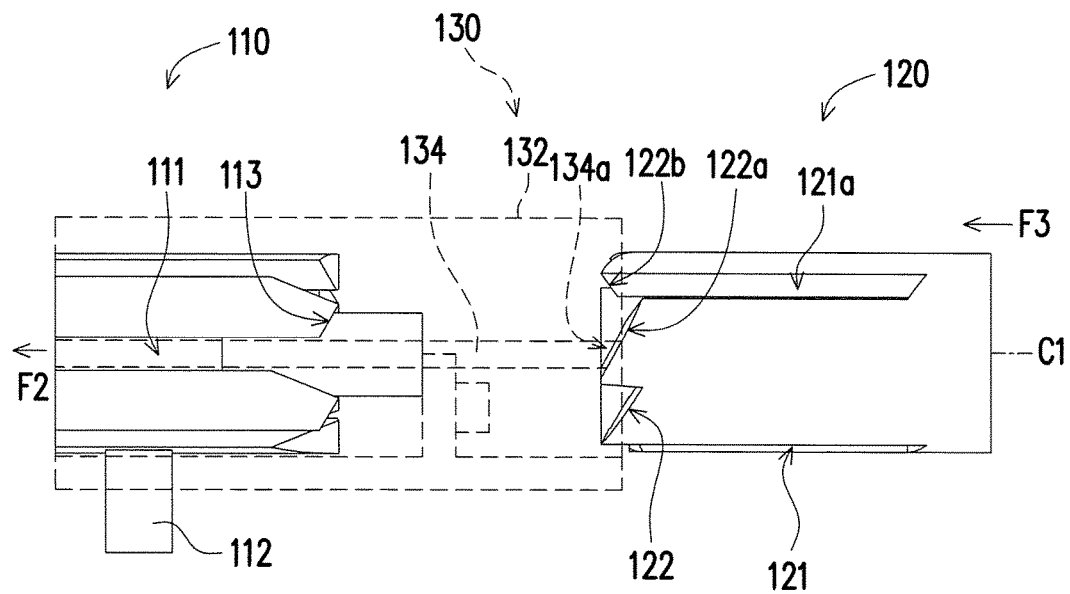

As shown in FIG. 7H, after the second guiding rod 120 is rotated by the torque T3, in the axial direction along the axis C1, the spiral-toothed bevel 122a then faces the guiding bevel 134a of the first guiding portion 134. Therefore, as shown in FIG. 7I, when the user releases the push handle 112 and no longer provides the applied force F1, the first guiding rod 110 is reset by the resilient force F2 of the elastic member 160, and then the second guiding rod 120, along with the moving member 140, is driven by the resilient force F3 of the elastic member 150 so as to move toward the direction of the negative Y axis. At the same time, the spiral-toothed bevel 122a contacts the guiding bevel 134a along the axis C1 so as to make the second guiding rod 120 temporarily locked to the opening of the sleeve 132.

Figure 7J:
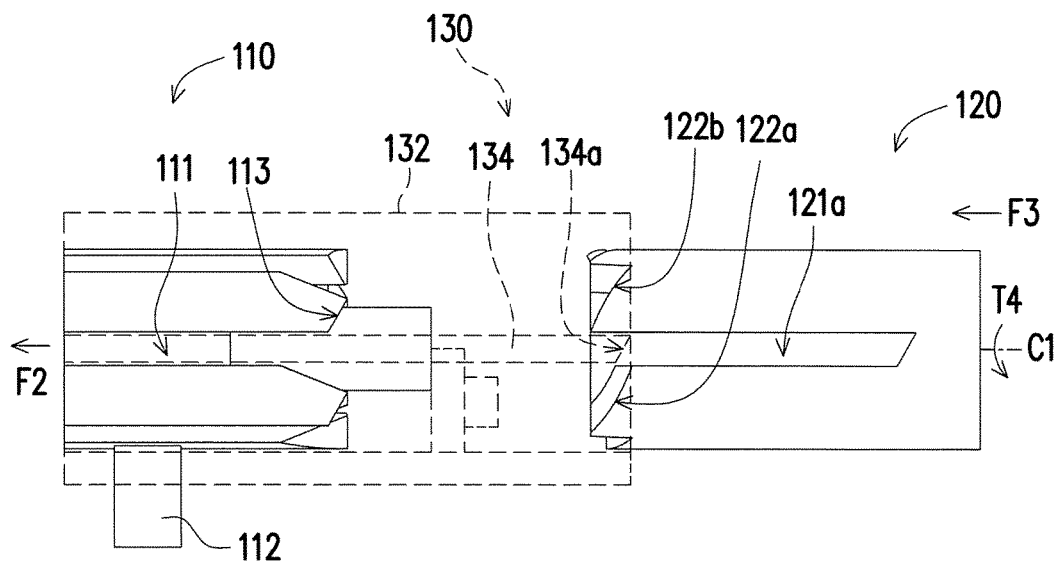

Then, just as the spiral-toothed bevel 122 contacts the guiding bevel 134a as described above, here it is in turn the spiral-toothed bevel 122a contacting the guiding bevel 134a. At the same time, driven by the resilient force F3, the second guiding rod 120 is thus rotated again by a torque T4, as shown in FIG. 7J. At this moment, the second guiding rod 120 that has been rotated faces the first guiding portion 134 with a second guiding portion 121a. As a result, the second guiding rod 120, driven by the resilient force F3, is smoothly moved inside the sleeve 132 along the first guiding portion 134 and finally returns to the initial position as shown in FIG. 7A.

Based on the above, the switching assembly 100 of this embodiment, by the spiral-toothed structure ST of the first guiding rod 110 and the second guiding rod 120, smoothly transforms a rectilinear motion along the axis C1 of these two components into a rotational motion about the axis C1. At the same time, by the interference or non-interference from the first guiding portion 134, the switching assembly 100 also determines the rotational timing of the second guiding rod 120. Simultaneously, the spiral-toothed structure ST of the second guiding rod 120 and the guiding bevel 134a at the end of the first guiding portion 134 are further coordinated with each other so that the rotational state of the second guiding rod 120 and the interference state of the fixing member 130 are determined again. Accordingly, the second guiding rod 120 is fixed to the opening of the sleeve 132 at the required time point (as shown in FIG. 7F), so that the moving member 140, which moves in conjunction with the second guiding rod 120, may keep the second object (i.e. the scroll wheel module 300 of this embodiment) in a use state (as shown in FIG. 6) or in an accommodation state (as shown in FIG. 5). Accordingly, relative states of the first object (the casing 200) and the second object (the scroll wheel module 300) of the electronic device 10 (the mouse) are changed by the switching assembly 100, and the first object and the second object may still exert a position maintaining (positioning) effect in these states respectively. In this way, the scroll wheel 310 of the mouse, when not in use, may be accommodated inside the casing 200 to be protected. In other words, by the switching assembly 100, the scroll wheel 310 may be moved back and forth relative to the X-Y plane along a second axis. Here the second axis is the Z axis or a virtual axis parallel to the Z axis. While the first axis is located on the X-Y plane or on a virtual plane that is parallel to the X-Y plane, the second axis is orthogonal to the X-Y plane. In light of the operation processes shown from FIG. 7A to FIG. 7I, the second guiding rod 120 is provided with a plurality of spiral teeth and a plurality of guiding slots (the second guiding portion 121), and any of the adjacent two guiding slots are spaced apart by two spiral teeth. Therefore, by applying a force twice (the process from FIG. 7A to FIG. 7D represents applying the force for the first time, and the process from FIG. 7F to FIG. 7H represents applying the force for the second time), the user may successfully make the second guiding rod 120 smoothly return to the initial state so as to attain a two-stage operation mode of ON/OFF required by the invention.

Figure 8A:
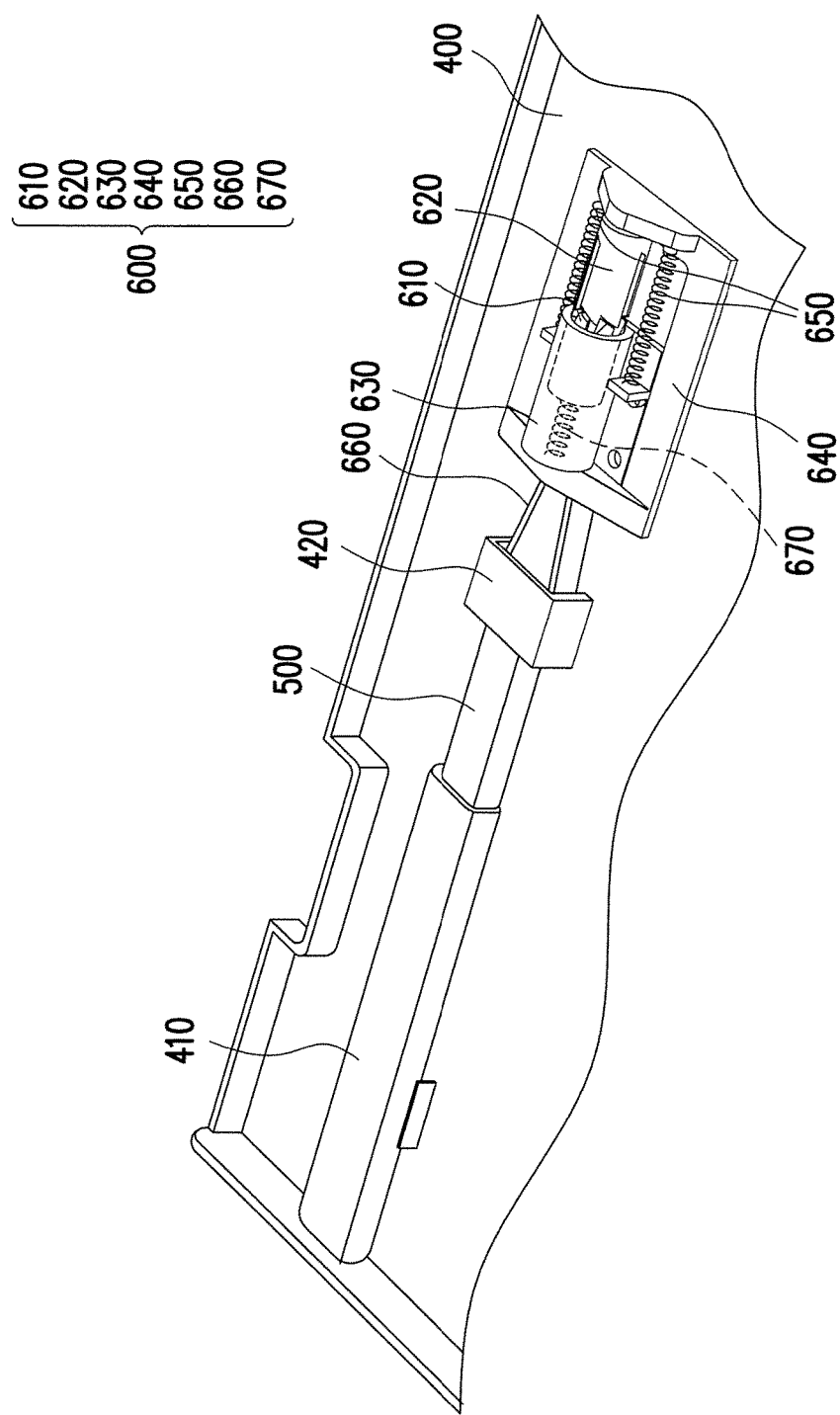
FIG. 8A illustrates a partial schematic view of an electronic device in another embodiment of the invention.
Figure 8B:
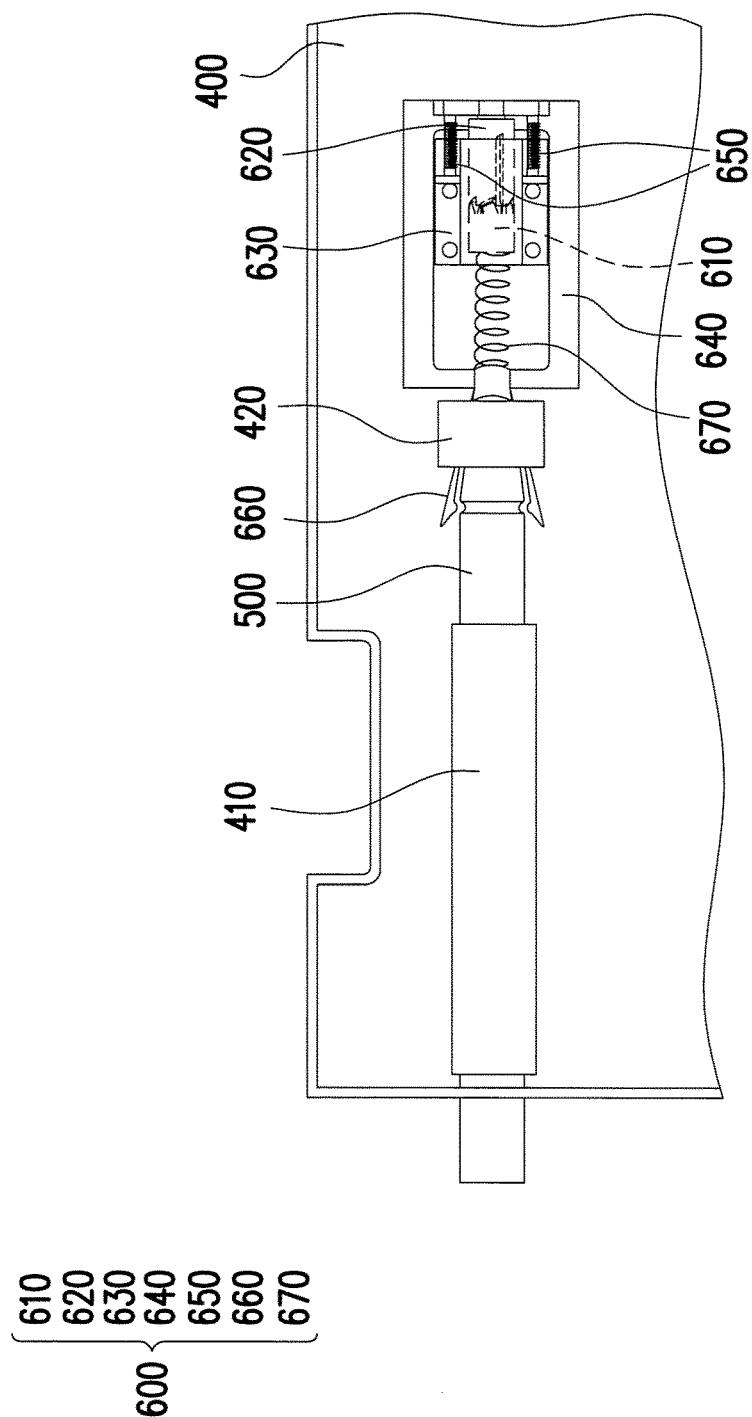
FIG. 8B and FIG. 8C illustrate partial top views of the electronic device in different states respectively.
Figure 8C:
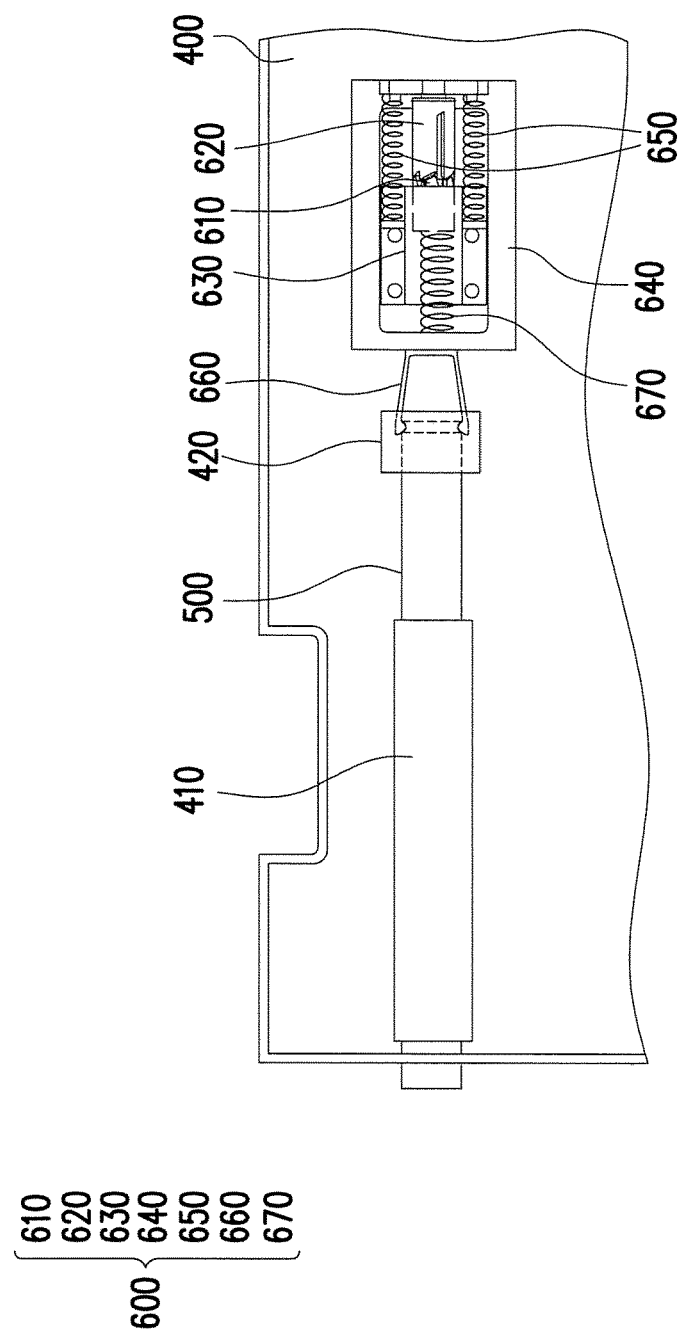

FIG. 8A illustrates a partial schematic view of an electronic device in another embodiment of the invention. FIG. 8B and FIG. 8C illustrate partial top views of the electronic device in different states respectively. Here FIG. 8A and FIG. 8C illustrate the same state. With reference to FIG. 8A to FIG. 8C simultaneously, in this embodiment, an electronic device 20 is, for example, a laptop computer or a mobile device. In coordination with the existing touch technology, the electronic device 20 further includes a stylus pen 500 to facilitate the user's operation. When not in use, the stylus pen 500 may be accommodated inside a body 400 by a switching assembly 600. As related operation techniques regarding the stylus pen can already been known from the prior art, the following section only describes how relative states of the stylus pen 500 and the body 400 are changed by the switching assembly 600.

In this embodiment, the switching assembly 600 is similar to the abovementioned switching assembly 100 and likewise includes a fixing member 630, a moving member 640, a first guiding rod 610, a second guiding rod 620 and an elastic member 650. Here the fixing member 630 is fixed on the body 400, and the moving member 640 is movably disposed on the body 400. The fixing member 630 likewise has a sleeve structure so that the first guiding rod 610 and the second guiding rod 620 are coaxially and movably disposed on the fixing member 630. The second guiding rod 620 may be viewed as being pivoted between the first guiding rod 610 and the moving member 640. At the same time, the elastic member 650 provides an effect of resetting the moving member 640 relative to the fixing member 630. Since corresponding relationships and states of movement of these components can already be known from the foregoing embodiment, details thereof are omitted here.

This embodiment is different from the foregoing embodiment in that the switching assembly 600 further includes a holding member 660 and an interlocking member 670. Here the holding member 660 is installed to the moving member 640, and the holding member 660 and the second guiding rod 620 may be viewed as located on opposite two sides of the sleeve structure of the fixing member 630. The interlocking member 670 is, for example, a compression spring and is connected between the first guiding rod 610 and the moving member 640. Moreover, the electronic device 20 further includes a restricting member 420 and a guiding member 410 disposed on the body 400. Here the body 400 has an opening (not shown) so that the stylus pen 500 may penetrate through the opening, the guiding member 410 and the restricting member 420 sequentially so as to contact the holding member 660. As shown in FIG. 8B, when the stylus pen 500 is moved toward the right side of the drawing, the switching assembly 600 drives (presses) the holding member 660 by the stylus pen 500 so as to drive the moving member 640 to move relative to the fixing member 630, thereby causing the first guiding rod 610 and the second guiding rod 620 to attain different positions and states as described in the forgoing embodiment. As a result, as shown in FIG. 8C, a holding end of the holding member 660 is then moved inside the restricting member 420 and is thus restricted by the restricting member 420 to be locked and held toward a groove of the stylus pen 500, such that the stylus pen 500 may be fixed and accommodated inside the body. Here during moving process of the moving member 640, by the configuration of the interlocking member 670, the first guiding rod 610 is able to move along with the moving member 640 synchronously and in the same direction.

Then, when the stylus pen 500 is to be removed, the user, in the state as shown in FIG. 8C, only needs to provide an applied force toward the right side of the drawing to press the stylus pen 500, thereby changing the movement pattern through the switching assembly 600. As a result, the moving member 640 drives the holding member 660 to move toward the left side of the drawing so as to make the holding end of the holding member 660 retreat from the restricting member 420. At the same time, in this embodiment, the holding member 660 has an elastic structure, and the holding end on the two sides of the holding member 660 is, for example, a spring leaf. When the holding member 660, driven by the stylus pen 500, moves the holding end thereof inside the restricting member 420, the holding member 660 is substantially in a deformed state. Therefore, after the holding end of the holding member 660 is retreated from the restricting member 420 as described above, the holding member 660, due to its resilient force, may further provide a force to move the stylus pen 500 toward the left side of the drawing, so that the stylus pen 500 may be further retracted over an appropriate distance, as shown in FIG. 8B, to facilitate the user to remove the stylus pen 500.

Figure 9A:
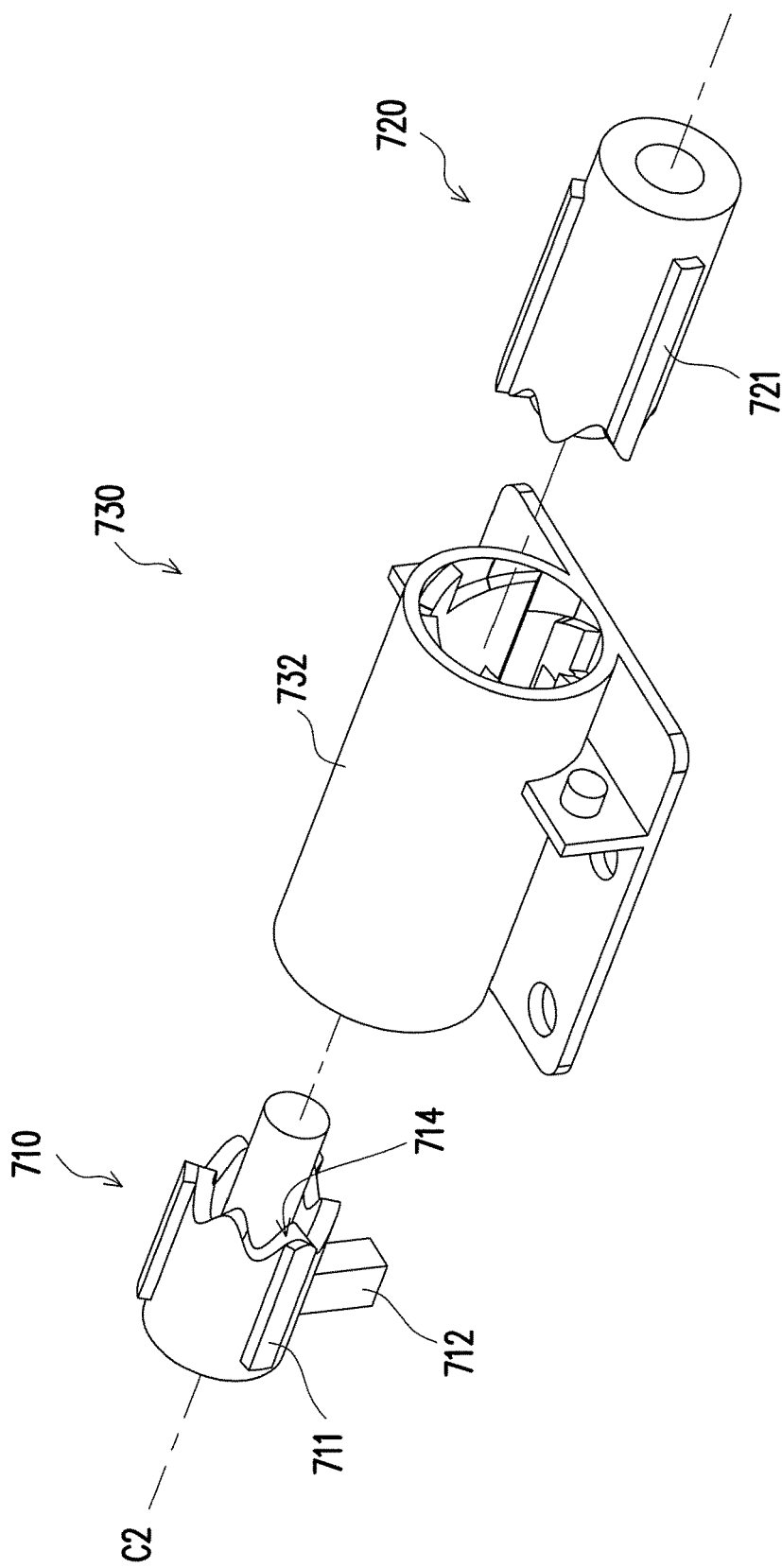
FIG. 9A and FIG. 9B respectively illustrate a switching assembly from different angels in another embodiment of the invention.
Figure 9B:
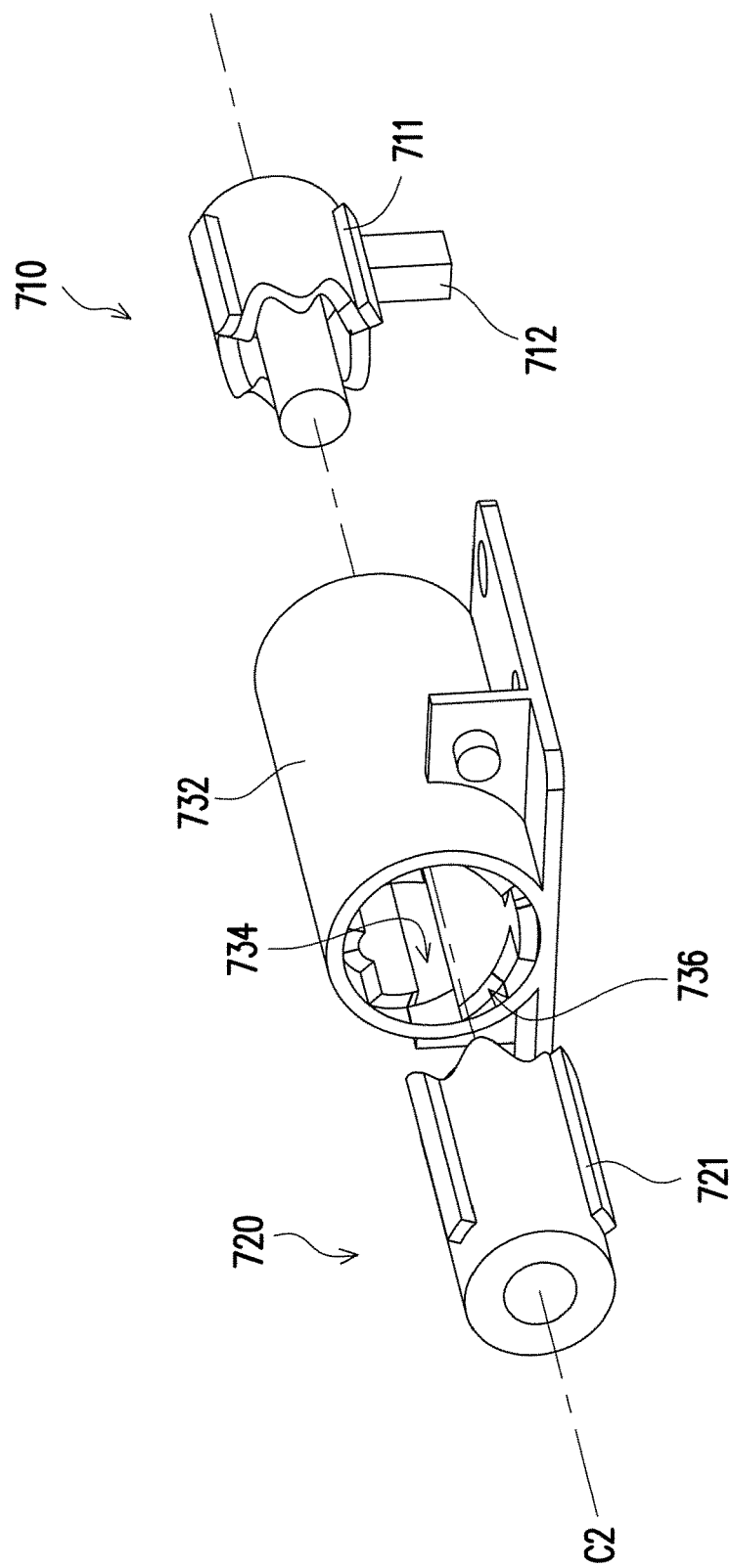

FIG. 9A and FIG. 9B respectively illustrate a switching assembly from different angels in another embodiment of the invention. FIG. 10A to FIG. 10K illustrate schematic views of the movement process of the switching assembly. Please refer to FIG. 9A and FIG. 9B simultaneously and in juxtaposition with FIG. 10A to FIG. 10K one by one to facilitate understanding of the state of movement of the switching assembly. It should be noted that this embodiment only explicates the switching assembly. Since the rest of the related peripheral components are the same as those of the foregoing embodiments, repeated description is omitted here.

In this embodiment, similar to the forgoing embodiments, a switching assembly 700 likewise includes a fixing member 730, a first guiding rod 710 and a second guiding rod 720, and relative positions of the components are the same as the abovementioned. However, the difference is that spiral-toothed structures of the first guiding rod 710 and the second guiding rod 720 of this embodiment are different in outside contours from the abovementioned. Here the spiral-toothed structure of the first guiding rod 710 and the second guiding rod 720 are arranged around an axis C2 and are symmetrical relative to the axis C2. That is to say, each of the spiral teeth of the first guiding rod 710 has the same tooth shape, each of the spiral teeth of the second guiding rod 720 has the same tooth shape, and the spiral-toothed structure of the first guiding rod 710 and the second guiding rod 720 are complementary to each other in contour so as to be engaged with each other.

Figure 10A:
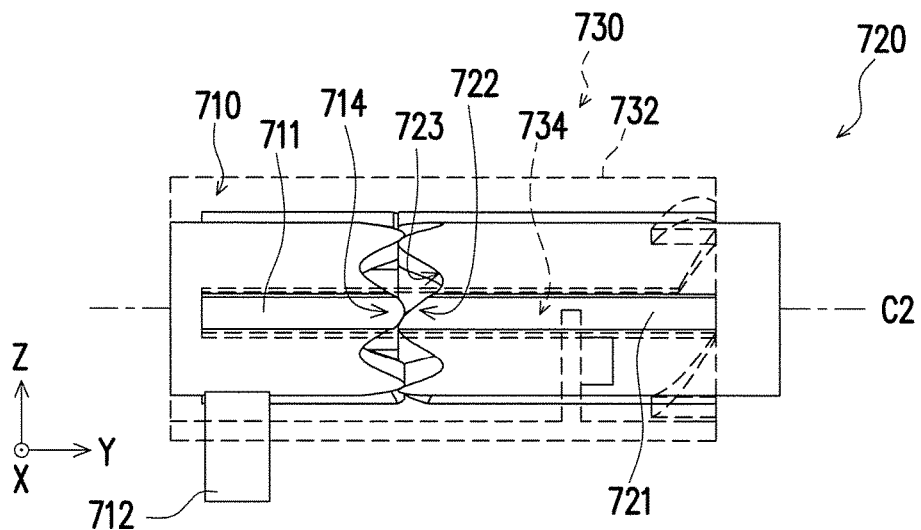
FIG. 10A to FIG. 10K illustrate schematic views of the movement process of the switching assembly.
Figure 10B:
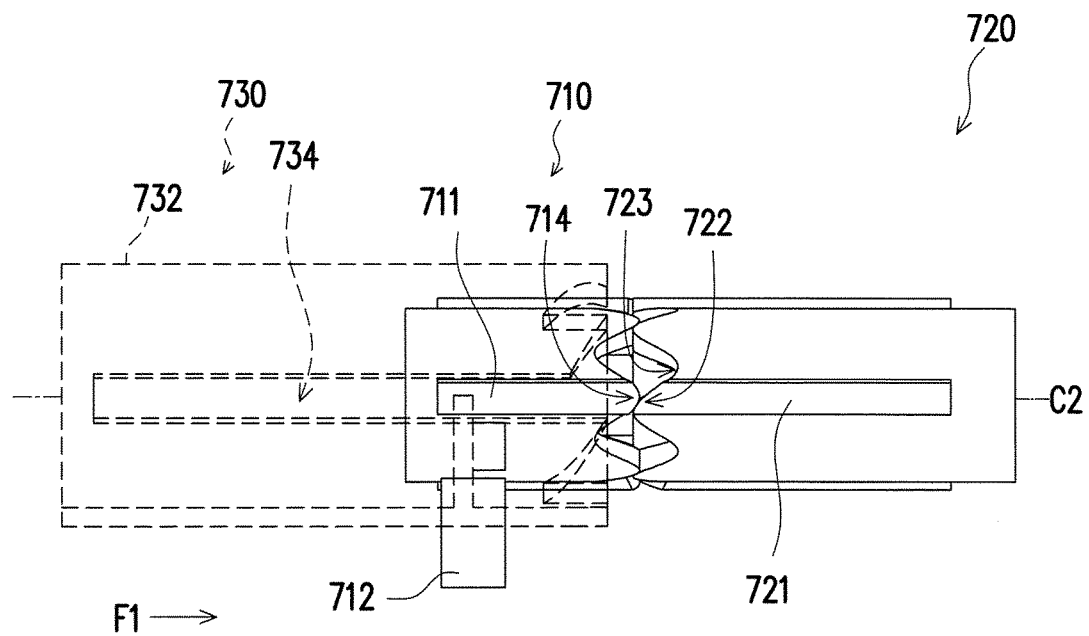

Moreover, an inner wall of a sleeve 732 of the fixing member 730 is provided with a first guiding portion, such as a guiding slot 734. The first guiding rod 710 is provided with a third guiding portion, such as a guiding rib 711, on the exterior. The second guiding rod 720 is provided with a second guiding portion, such as a guiding rib 721, on the exterior thereof. When the first guiding rod 710 and the second guiding rod 720 are located inside the sleeve 732, they are coupled to the guiding slot 734 by the guiding ribs 711 and 721 respectively, so that during the moving process from FIG. 10A to FIG. 10B, the second guiding rod 720 may move along the axis C2 instead of rotating about the axis C2. In other words, when a user provides an applied force F1 to a push handle 712 of the first guiding rod 710, the first guiding rod 710 presses a spiral-toothed surface 722 (a convex contour) of the second guiding rod 720 by a spiral-toothed surface 714 (a convex contour), thereby gradually pushing the second guiding rod 720 out of and away from the sleeve 732, as shown in FIG. 10B.

Figure 10C:
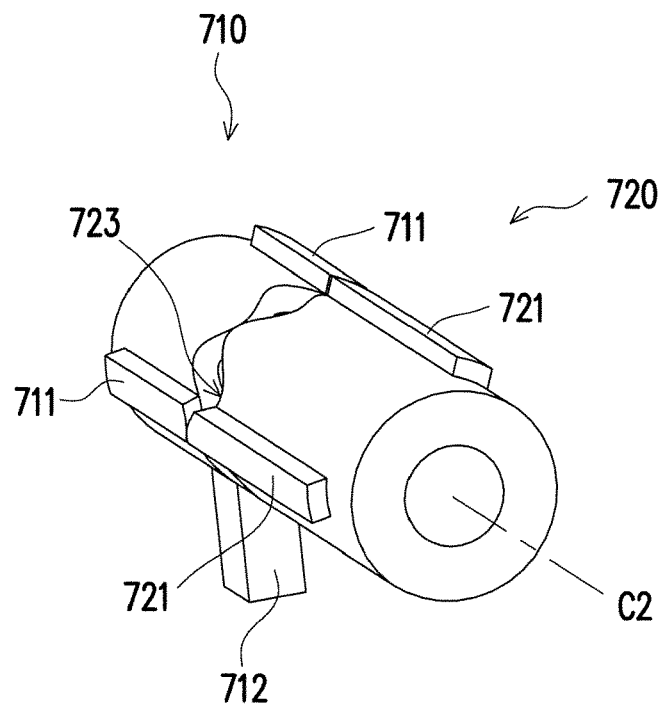
Figure 10D:
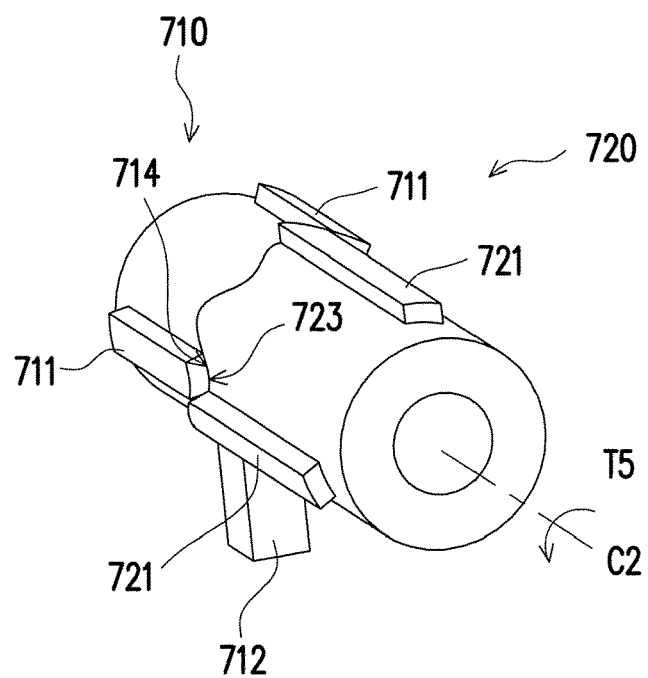
Figure 10E:
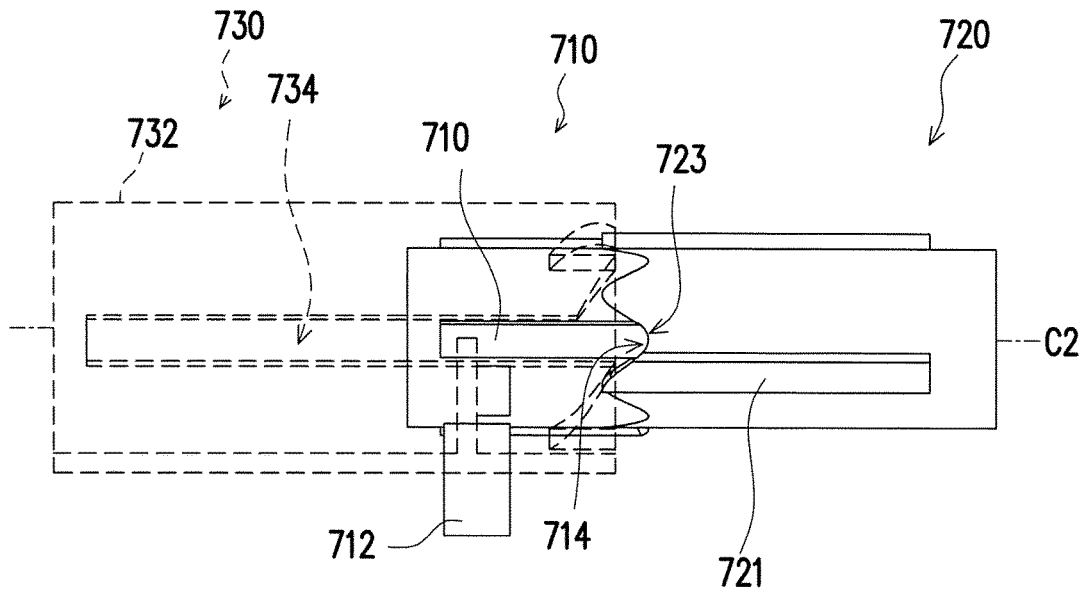

Please refer to FIG. 10C to FIG. 10E. Here FIG. 10C corresponds to the state as shown in FIG. 10B and FIG. 10E corresponds to the state as shown in FIG. 10D. After the second guiding rod 720 is pushed out of the sleeve 732 of the fixing member 730, without interferences from the guiding rib 721 and the guiding slot 734 as described above, the spiral-toothed surfaces 714 and 722 thus contact each other to generate a torque T5, so that the second guiding rod 720 is rotated about the axis C2 relative to the first guiding rod 710. It is not until another spiral-toothed surface 723 (a concave contour) of the second guiding rod 720 contacts the spiral-toothed surface 714 of the first guiding rod 710 that such rotation is stopped, as shown in FIG. 10D. At this moment, the spiral-toothed structure of the first guiding rod 710 and the second guiding rod 720 are in a state of engaging with each other.

Figure 10F:
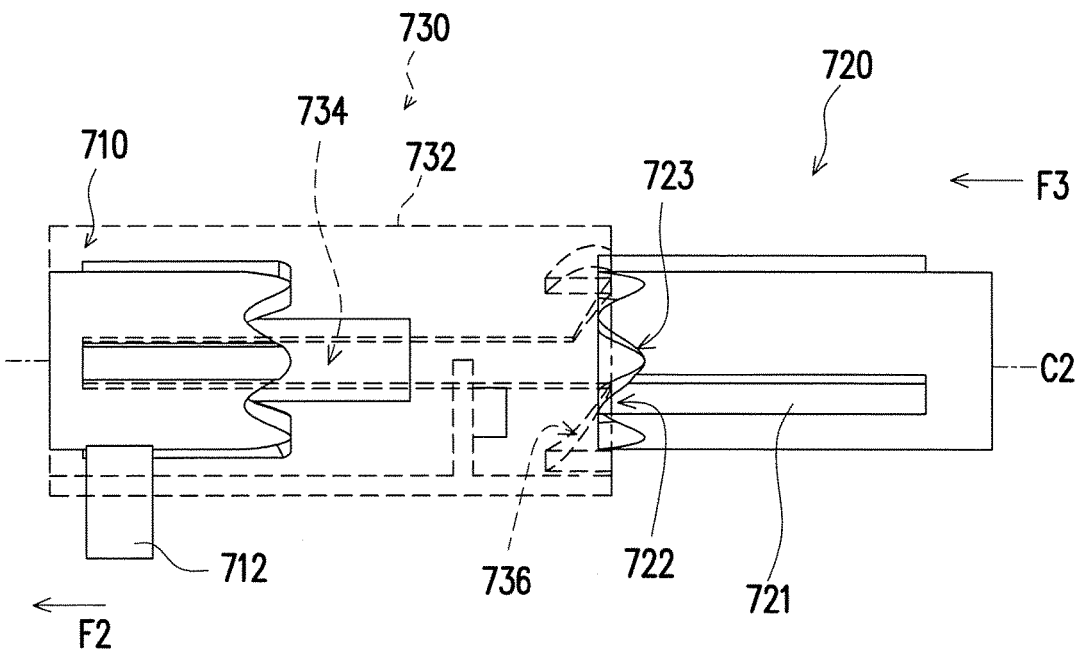
Figure 10G:
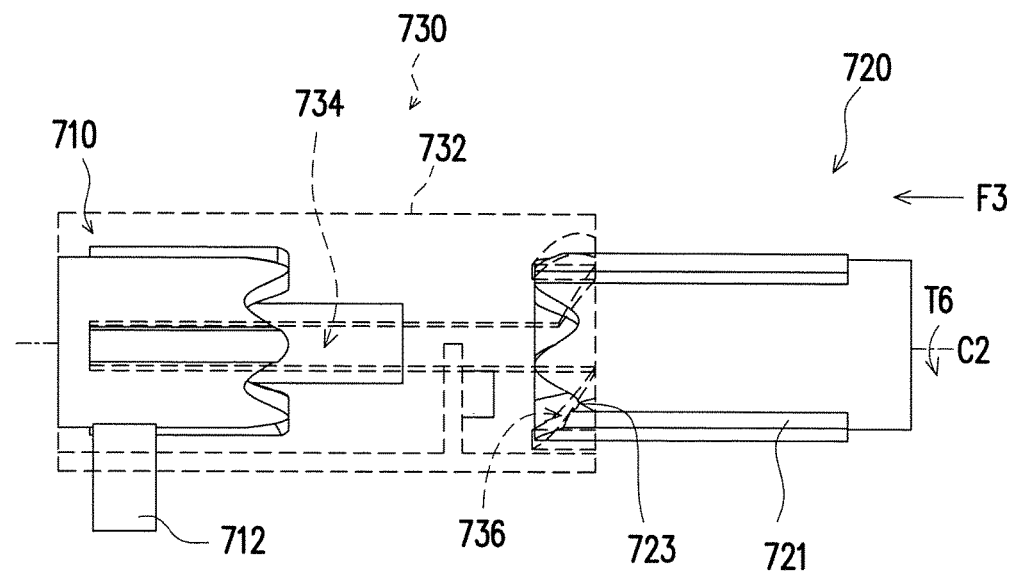

Then, with reference to FIG. 10F and FIG. 10G, at this moment the user no longer provides the applied force F1. Therefore, due to a resilient force F2 of an elastic member 160, the first guiding rod 710 is reset toward the direction of the negative Y axis (to the position as shown in FIG. 10A). At this moment, the second guiding rod 720 is driven by a resilient force F3 of the elastic member 160. However, because a guiding bevel 736 of the fixing member 730 blocks a moving path of the spiral-toothed surface 722, the second guiding rod 720 as a result contacts the guiding bevel 736 by the spiral-toothed surface 722. A torque T6 is in turn generated to rotate the second guiding rod 720 about the axis C2 until the spiral-toothed surface 723 is locked to the guiding bevel 736, as shown in FIG. 10G. Here the state as shown in FIG. 10G in this embodiment corresponds to the state as shown in FIG. 7F in the foregoing embodiments; that is, the state in which the scroll wheel 310 of the scroll wheel module 300 protrudes out of the casing 200, or the state in which the stylus pen 500 is held and fixed inside the body 400.

Figure 10H:
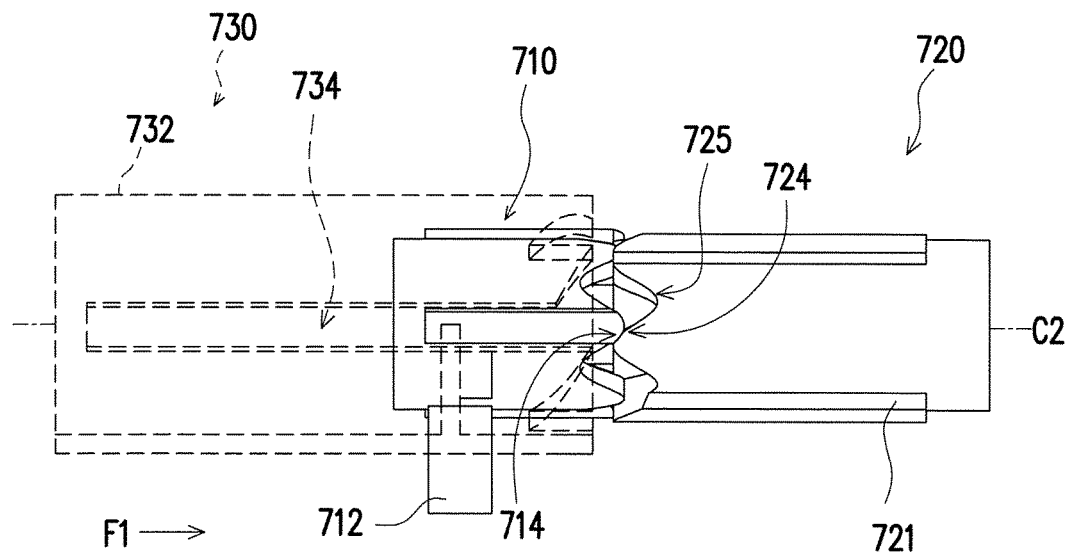
Figure 10I:
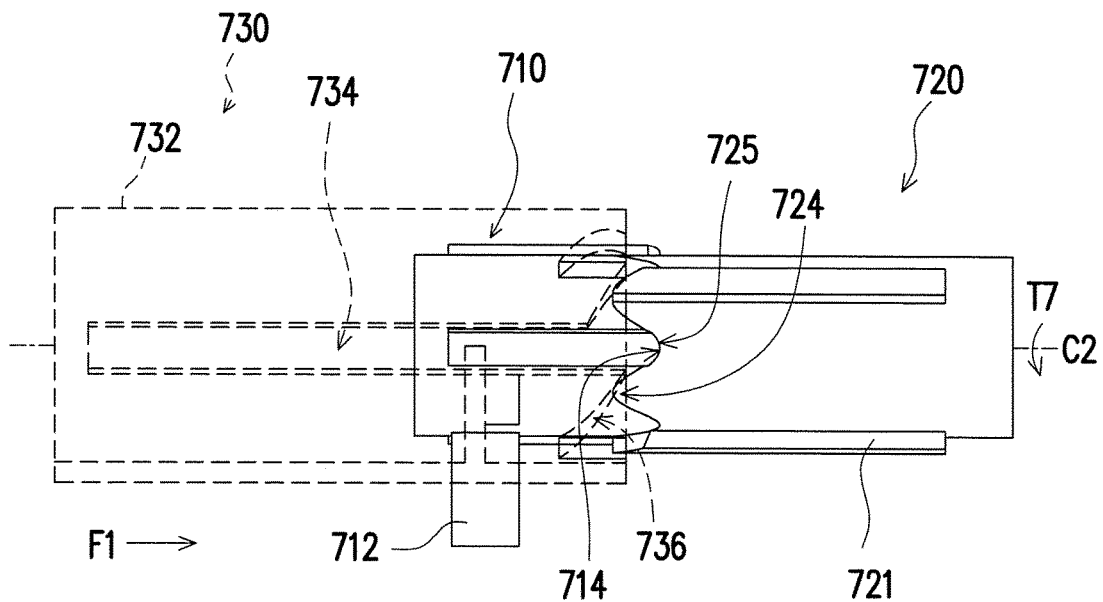

Then, with reference to FIG. 10H and FIG. 10I, the user provides the applied force F1 to push the first guiding rod 710 again so that the first guiding rod 710 contacts a spiral-toothed surface 724 (a convex contour) of the second guiding rod 720 by the spiral-toothed surface 714 thereof, and the second guiding rod 720 is pushed away from the fixing member 730. Then, in a state as shown in FIG. 10I, the two spiral-toothed surfaces 714 and 724 contact each other to generate a torque T7, thereby rotating the second guiding rod 720 about the axis C2 until a spiral-toothed surface 725 (a concave contour) of the second guiding rod 720 contacts and is locked to the spiral-toothed surface 714 of the first guiding rod 710. At this moment, the first guiding rod 710 and the second guiding rod 720 are engaged with each other again.

Figure 10J:
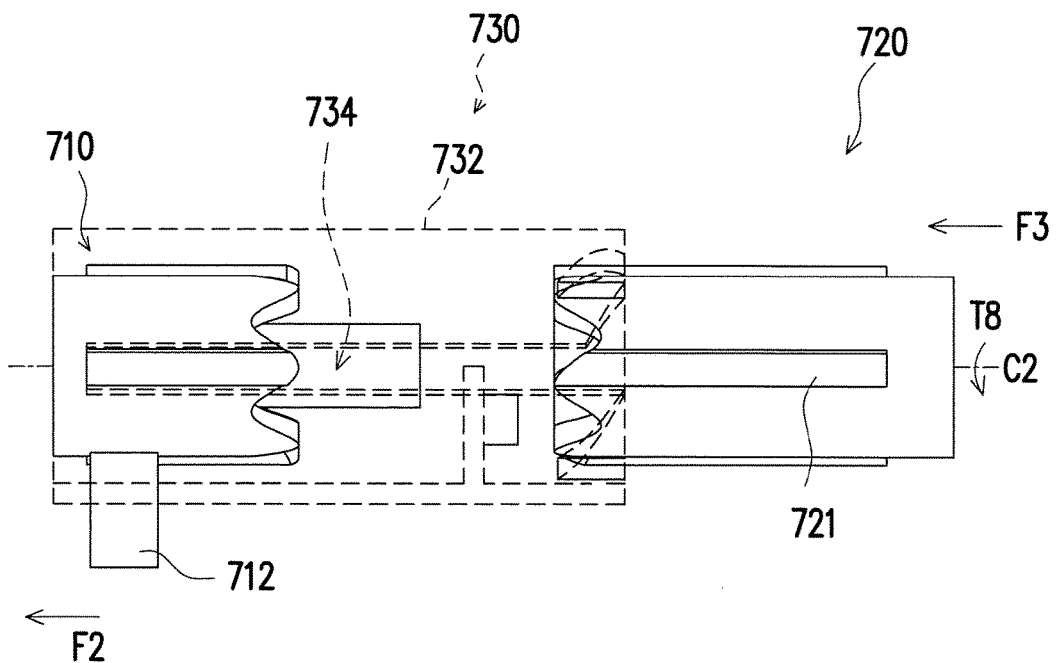
Figure 10K:
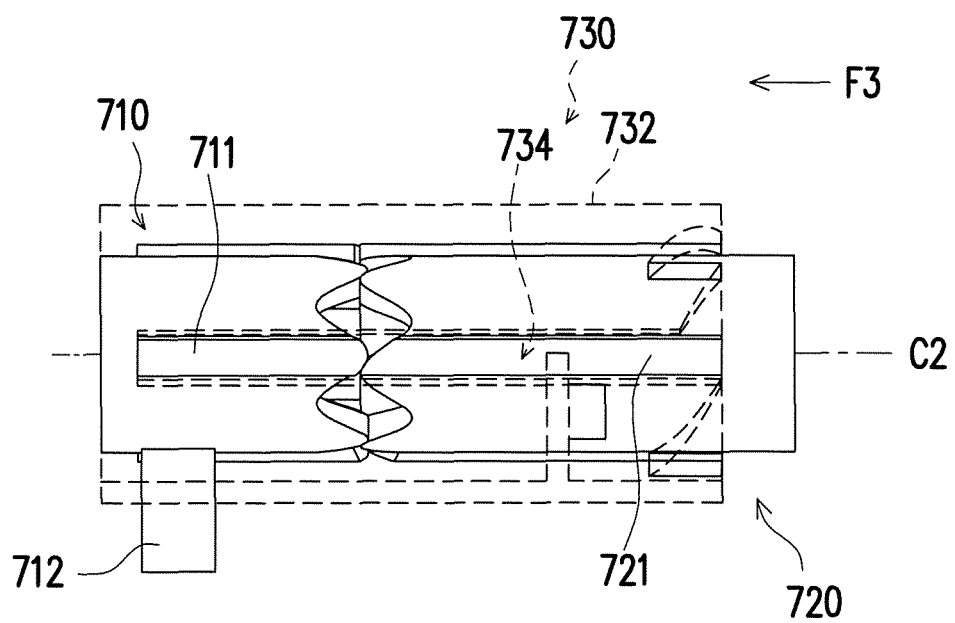

Finally, since the user no longer provides the applied force F1, the first guiding rod 710 is reset again due to the resilient force F2 of the elastic member 160. The second guiding rod 720 is likewise driven by the resilient force F3 of the elastic member 160 so as to move toward the fixing member 730 along the axis C2. At the same time, because the spiral-toothed surface 724 contacts the guiding bevel 736 (as shown in FIG. 10I), a torque T8 is thus generated to rotate the second guiding rod 720 about the axis C2, so that the guiding rib 721 is aligned with the guiding slot 734 (as shown in FIG. 10J). Finally, the second guiding rod 720 is smoothly moved inside the sleeve 732 as shown in FIG. 10K and returns to the state as shown in FIG. 10A.

In light of the above embodiments, in order to coordinate with the driving mode of the object (such as the scroll wheel module 300 or the stylus pen 500), i.e. to generate a component movement pattern such as a push-push type for the user, in the embodiments of the present application, there exists a fixed configuration frequency between the spiral-toothed structure and the guiding rib 721 of the second guiding rod 720 (or the guiding slot, the second guiding portion 121, of the second guiding rod 120). That is, the second guiding rod 720 circles around the path of the axis C2 (or the second guiding rod 120 circles around the path of the axis C1), and the guiding ribs 721 (or the guiding slots 121) are spaced apart by two spiral teeth as the configuration frequency.

In summary of the above, in the foregoing embodiments of the invention, the switching assembly, by the spiral-toothed structure of the first guiding rod and the second guiding rod, smoothly transforms a rectilinear motion along the axis of these two components into a rotational motion about the axis. At the same time, by the interference or non-interference from the guiding rib, the switching assembly also determines the rotational timing of the second guiding rod. Simultaneously, the spiral-toothed structure of the second guiding rod and the guiding bevel of the guiding rib are coordinated with each other so that the rotational state of the second guiding rod and the interference state of the fixing member are determined again. Accordingly, the second guiding rod is fixed to the opening of the sleeve at the required time point so as to achieve a positioning effect, that is, to enable the second object at the moment to have enough structural strength for operation.

Furthermore, in another embodiment, the second object is, for example, the stylus pen that may be accommodated inside the body of the electronic device. Similarly, by using the abovementioned switching module, a two-stage effect of ON/OFF is achieved so that the stylus pen, when not in use, may be smoothly pressed inside the body to be accommodated. And when the user presses again, the movement of the switching assembly then pushes out the stylus pen to facilitate the user to take it.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A switching assembly used for changing relative states of a first object and a second object in an electronic device, the switching assembly comprising:
   a fixing member, fixed on the first object and having a first guiding portion, an extension direction of the first guiding portion being parallel to a first axis;
   a first guiding rod slidably coupled to the first guiding portion to move along the first axis relative to the fixing member;
   a moving member movably disposed on the first object, wherein the second object is movably coupled to the moving member and is driven by the moving member; and
   a second guiding rod pivoted between the first guiding rod and the moving member in the first axis, wherein the first guiding rod is suited for being forced to move the second guiding rod and the moving member along the first axis so as to rotate the second guiding rod relative to the first guiding rod and the moving member, thereby switching the second guiding rod between a first state and a second state, in the first state the second guiding rod is slidably connected to the first guiding portion, and in the second state the second guiding rod contacts an end of the first guiding portion along the first axis.

2. The switching assembly as recited in claim 1, wherein the first guiding rod and the second guiding rod have a spiral-toothed structure configured to circle around the first axis, so that the second guiding rod contacts the first guiding rod along the first axis by the spiral-toothed structure, the second guiding rod is either rotated relative to the first guiding rod in the first axis or locked to the first guiding rod, and in the first state the first guiding portion interferes with a rotation of the second guiding rod.

3. The switching assembly as recited in claim 2, wherein the spiral-toothed structure comprises a plurality of first spiral-toothed bevels located at an end of the first guiding rod and a plurality of second spiral-toothed bevels located at an end of the second guiding rod, the plurality of first spiral-toothed bevels and the plurality of second spiral-toothed bevels are inclined relative to the first axis respectively, and the plurality of first spiral-toothed bevels and the plurality of second spiral-toothed bevels slidably contact each other.

4. The switching assembly as recited in claim 3, wherein the second guiding rod has at least one second guiding portion that has an extension direction parallel to the first axis; in the first state, the first guiding portion is coupled to the at least one second guiding portion, and a portion of the first spiral-toothed bevel and a portion of the second spiral-toothed bevel contact each other along the first axis; and in the second state, the first guiding portion is moved away from the at least one second guiding portion so as to release a rotational interference with the second guiding rod, and the first spiral-toothed bevel and the second spiral-toothed bevel slide relative to each other so as to rotate the second guiding rod relative to the first guiding rod, causing the second guiding rod and the first guiding rod to be locked with each other by the spiral-toothed structure,
   wherein the first guiding portion and the second guiding portion are respectively a guiding rib and a guiding slot or a guiding slot and a guiding rib.

5. The switching assembly as recited in claim 2, wherein the fixing member has a guiding bevel located at the end of the first guiding portion, the spiral-toothed structure comprises a plurality of second spiral-toothed bevels located at an end of the second guiding rod, and when the first guiding rod is moved away from the second guiding rod and when the second guiding rod is forced along the first axis so that the guiding bevel contacts one of the plurality of second spiral-toothed bevels, the second guiding rod is rotated about the first axis relative to the first guiding portion until the first guiding portion is locked to the spiral-toothed structure,
   wherein the first guiding portion and the second guiding portion are respectively a guiding rib and a guiding slot or a guiding slot and a guiding rib.

6. The switching assembly as recited in claim 2, wherein the fixing member has a guiding bevel located at the end of the first guiding portion, the spiral-toothed structure comprises a plurality of second spiral-toothed bevels located at an end of the second guiding rod, and when the first guiding rod is moved away from the second guiding rod and when the second guiding rod is forced along the first axis so that the guiding bevel contacts one of the plurality of second spiral-toothed bevels, the second guiding rod is rotated about the first axis relative to the first guiding portion until the first guiding portion is moved into the fixing member along a second guiding portion of the second guiding rod,
wherein the first guiding portion and the second guiding portion are respectively a guiding rib and a guiding slot or a guiding slot and a guiding rib.

7. The switching assembly as recited in claim 2, wherein the fixing member has a guiding bevel located at the end of the first guiding portion, and the guiding bevel is a portion of the first guiding portion or a portion of the fixing member adjacent to the first guiding portion,
wherein the first guiding portion and the second guiding portion are respectively a guiding rib and a guiding slot or a guiding slot and a guiding rib.

8. The switching assembly as recited in claim 2, further comprising a first elastic member connected between the fixing member and the moving member, wherein the first guiding rod is suited for being forced to drive the second guiding rod and the moving member along a first direction of the first axis, and the first elastic member constantly drives the moving member and the second guiding rod to move along a second direction of the first axis, the first direction being opposite to the second direction.

9. The switching assembly as recited in claim 8, wherein after the first guiding rod drives the second guiding rod to move away from the first guiding portion along the first direction, the second guiding rod is driven by the first elastic member along the second direction to generate a torque so that the second guiding rod is rotated about the first axis.

10. The switching assembly as recited in claim 2, further comprising a second elastic member connected between the first object and the first guiding rod, wherein the first guiding rod is suited for being forced to drive the second guiding rod and the moving member along a first direction of the first axis, and the second elastic member constantly drives the first guiding rod to move along a second direction of the first axis, the first direction being opposite to the second direction.

11. The switching assembly as recited in claim 2, wherein the spiral-toothed structure comprises a plurality of spiral teeth located at an end of the second guiding rod and circling around the first axis, the second guiding rod further has a plurality of second guiding portions, each of the plurality of second guiding portions has an extension direction parallel to the first axis, and adjacent two of the plurality of spiral teeth are located between adjacent two of the plurality of second guiding portions.

12. The switching assembly as recited in claim 1, wherein the electronic device is a mouse, the first object is a casing of the mouse, the second object is a scroll wheel module of the mouse, and a scroll wheel of the scroll wheel module protrudes out of the casing or sinks inside the casing as the second guiding rod is switched between the first state and the second state.

13. The switching assembly as recited in claim 12, wherein the scroll wheel module further has a circuit board and a plurality of first brackets, the plurality of first brackets are disposed under the circuit board, the scroll wheel is disposed on the circuit board, the casing further has a base and a plurality of second brackets, the plurality of second brackets are disposed on the base, the plurality of first brackets are correspondingly and slidably coupled to the plurality of second brackets, the switching assembly is disposed on the base and located under the scroll wheel, and the first axis is parallel to a plane where the base is located.

14. The switching assembly as recited in claim 13, wherein the scroll wheel module further has a guiding rod disposed under the circuit board, the moving member of the switching assembly further has an oblique guiding slot inclined relative to the plane, and the guiding rod is slidably coupled to the oblique guiding slot so as to move the scroll wheel along a second axis relative to the plane, the second axis being orthogonal to the plane.

15. The switching assembly as recited in claim 1, wherein the first object is a stylus pen; the second object is a body of the electronic device; the switching assembly further comprises a holding member that is assembled to the moving member so as to move along the first axis with the moving member; the electronic device further comprises a restricting member fixed on the body and located on the first axis; a portion of the holding member movably penetrates through the restricting member; the stylus pen is moved into the body along the first axis so as to contact the holding member; and when the second guiding rod is switched between the first state and the second state, the stylus pen drives an holding end of the holding member to move into the restricting member and be restricted by the restricting member so that the stylus pen is locked to the holding end of the holding member, or the moving member drives the holding end of the holding member to move out of the restricting member so that the stylus pen is driven to retreat from the body.

\* \* \* \* \*